United States Patent
Tanaka

[19]

[11] Patent Number: 5,939,871
[45] Date of Patent: *Aug. 17, 1999

[54] DC/DC CONVERTER AND CONTROLLER THEREFOR UTILIZING AN OUTPUT INDUCTOR CURRENT AND INPUT VOLTAGE

[75] Inventor: Hiroto Tanaka, Kariya, Japan

[73] Assignee: Kabushiki Kaisha Toyoda Jidoshokki Seisakusho, Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/792,256

[22] Filed: Jan. 31, 1997

[30] Foreign Application Priority Data

Feb. 1, 1996 [JP] Japan .................................... 8-016553

[51] Int. Cl.⁶ ....................................................... G05F 1/40
[52] U.S. Cl. .......................................... 323/285; 323/290
[58] Field of Search ................................... 323/285, 290, 323/283, 284, 286; 330/260

[56] References Cited

U.S. PATENT DOCUMENTS

| | | | |
|---|---|---|---|
| 3,458,798 | 7/1969 | Fang et al. | 321/43 |
| 3,579,091 | 5/1971 | Clarke et al. | 323/22 |
| 3,581,186 | 5/1971 | Weinberger | 321/43 |
| 3,582,758 | 6/1971 | Gunn | 321/47 |
| 3,624,405 | 11/1971 | Bishop et al. | 307/33 |
| 3,699,424 | 10/1972 | Hart et al. | 321/11 |
| 3,733,540 | 5/1973 | Hawkins | 321/47 |
| 3,737,755 | 6/1973 | Calkin et al. | 321/2 |
| 3,781,505 | 12/1973 | Steigerwald | 219/10.49 |
| 3,816,809 | 6/1974 | Kuster | 321/14 |
| 3,820,005 | 6/1974 | Steigerwald | 321/18 |
| 3,863,128 | 1/1975 | Wilwerding | 320/21 |
| 3,978,393 | 8/1976 | Wisner et al. | 323/17 |
| 3,989,995 | 11/1976 | Peterson | 321/2 |

(List continued on next page.)

FOREIGN PATENT DOCUMENTS

| | | |
|---|---|---|
| 0 428 377 A2 | 5/1991 | European Pat. Off. . |
| 0 428 377 B1 | 5/1991 | European Pat. Off. . |
| 428377 A2 | 5/1991 | European Pat. Off. . |
| 60-32565 | 2/1985 | Japan . |
| 60-156269 | 8/1985 | Japan . |
| 4-101286 | 1/1991 | Japan . |
| 3-113986 | 11/1991 | Japan . |
| 4-42771 | 2/1992 | Japan . |
| 92-2362 | 2/1992 | Japan . |
| H4-42771 | 2/1992 | Japan . |
| H4-101286 | 9/1992 | Japan . |

OTHER PUBLICATIONS

Harris Semiconductor Data Sheet, "HIP5060 Power Control IC Single Chip Power Supply," Jan./1992 pp. I–3.

Linear Technology Corporation, Application Note 25, "Switching Regulator for Poets". Sep./1987 pp. AN25–1–An25–24.

Linear Technology Corporation, Application Note 29, "Some Thoughts on DC–DC Converters". Oct./1988 pp An29–1–An29–44.

(List continued on next page.)

Primary Examiner—Shawn Riley
Attorney, Agent, or Firm—Woodcock Wasburn Kurtz Mackiewicz & Norris, LLP

[57] ABSTRACT

A switching element is controlled by a control circuit. When the switching element is in an ON state, a coil current $I_L$ ramps up. When the switching element is in an OFF state, the coil current $I_L$ ramps down. If an output voltage $V_{out}$ is smaller than a predetermined output voltage value, a control circuit is informed of it. If the coil current $I_L$ rises to a peak current $I_{LP}$ set by a setting circuit, the control circuit is informed of it. The setting circuit sets the peak current $I_{LP}$ proportional to an input voltage $V_{in}$. The control circuit sets the switching element in the ON state when the output voltage $V_{out}$ is smaller than the predetermined output voltage value, and sets the switching element in the OFF state when the coil current $I_L$ rises to the peak current $I_{LP}$.

13 Claims, 14 Drawing Sheets

U.S. PATENT DOCUMENTS

| | | | |
|---|---|---|---|
| 4,013,939 | 3/1977 | Biess et al. | 323/17 |
| 4,035,710 | 7/1977 | Joyce | 363/37 |
| 4,071,884 | 1/1978 | Maigret | 363/21 |
| 4,107,596 | 8/1978 | Weaver et al. | 323/17 |
| 4,129,788 | 12/1978 | Chavannes | 307/11 |
| 4,160,288 | 7/1979 | Stuart et al. | 363/41 |
| 4,161,023 | 7/1979 | Goffeau | 363/124 |
| 4,200,830 | 4/1980 | Oughton et al. | 320/32 |
| 4,244,050 | 1/1981 | Weber et al. | 371/66 |
| 4,288,831 | 9/1981 | Dolikian | 361/92 |
| 4,301,398 | 11/1981 | Johnson | 320/21 |
| 4,302,805 | 11/1981 | Marez et al. | 363/91 |
| 4,315,304 | 2/1982 | Marez et al. | 363/49 |
| 4,323,840 | 4/1982 | Gawler | 323/287 |
| 4,326,245 | 4/1982 | Saleh | 363/79 |
| 4,395,675 | 7/1983 | Toumani | 323/271 |
| 4,413,224 | 11/1983 | Krupka et al. | 323/222 |
| 4,428,015 | 1/1984 | Nesler | 361/18 |
| 4,438,485 | 3/1984 | Voigt | 363/21 |
| 4,462,069 | 7/1984 | Becky | 363/23 |
| 4,478,174 | 10/1984 | Cates | 363/21 |
| 4,488,057 | 12/1984 | Clarke | 307/66 |
| 4,493,017 | 1/1985 | Kammiller et al. | 363/132 |
| 4,519,024 | 5/1985 | Federico et al. | 363/127 |
| 4,538,101 | 8/1985 | Shimpo et al. | 323/272 |
| 4,541,041 | 9/1985 | Park | 363/41 |
| 4,549,254 | 10/1985 | Kissel | 363/21 |
| 4,578,630 | 3/1986 | Grosch | 323/271 |
| 4,585,986 | 4/1986 | Dyer | 323/271 |
| 4,586,119 | 4/1986 | Sutton | 363/173 |
| 4,610,521 | 9/1986 | Inoue | 354/145.1 |
| 4,631,652 | 12/1986 | Wendt | 363/16 |
| 4,634,956 | 1/1987 | Davis et al. | 323/222 |
| 4,639,845 | 1/1987 | Persson et al. | 363/26 |
| 4,649,464 | 3/1987 | Shono | 363/21 |
| 4,672,303 | 6/1987 | Newton | 323/285 |
| 4,706,177 | 11/1987 | Josephson | 363/24 |
| 4,709,234 | 11/1987 | Forehand et al. | 340/856 |
| 4,709,315 | 11/1987 | Ramos | 363/21 |
| 4,709,320 | 11/1987 | Konopka | 363/56 |
| 4,713,740 | 12/1987 | Drabing | 363/17 |
| 4,716,514 | 12/1987 | Patel | 363/127 |
| 4,727,308 | 2/1988 | Huljak et al. | 323/222 |
| 4,734,771 | 3/1988 | Lendaro et al. | 358/190 |
| 4,745,535 | 5/1988 | Sugishima et al. | 363/19 |
| 4,754,385 | 6/1988 | McDade et al. | 363/16 |
| 4,761,722 | 8/1988 | Pruitt | 363/17 |
| 4,775,821 | 10/1988 | Sikora | 315/219 |
| 4,779,027 | 10/1988 | Sikora | 315/127 |
| 4,789,818 | 12/1988 | Furuta | 323/285 |
| 4,801,859 | 1/1989 | Dishner | 323/224 |
| 4,808,946 | 2/1989 | Carver et al. | 330/297 |
| 4,809,150 | 2/1989 | Limuti et al. | 363/21 |
| 4,813,066 | 3/1989 | Holtz et al. | 379/413 |
| 4,819,122 | 4/1989 | Gontowski, Jr. | 361/93 |
| 4,823,070 | 4/1989 | Nelson | 323/285 |
| 4,825,028 | 4/1989 | Smith | 219/10.55 B |
| 4,825,144 | 4/1989 | Alberkrack et al. | 323/272 |
| 4,843,532 | 6/1989 | Freedman | 363/26 |
| 4,866,587 | 9/1989 | Wadlington | 363/16 |
| 4,870,555 | 9/1989 | White | 363/21 |
| 4,873,408 | 10/1989 | Smith et al. | 219/10.55 |
| 4,884,183 | 11/1989 | Sable | 363/41 |
| 4,902,957 | 2/1990 | Cassani et al. | 323/222 |
| 4,906,901 | 3/1990 | Carroll | 315/297 |
| 4,922,404 | 5/1990 | Ludwig et al. | 363/89 |
| 4,928,200 | 5/1990 | Redl et al. | 361/93 |
| 4,929,882 | 5/1990 | Szepesi | 323/222 |
| 4,931,716 | 6/1990 | Jovanovic et al. | 323/285 |
| 4,996,638 | 2/1991 | Orr | 363/21 |
| 5,028,861 | 7/1991 | Pace et al. | 323/284 |
| 5,034,871 | 7/1991 | Okamoto et al. | 363/15 |
| 5,066,900 | 11/1991 | Bassett | 323/224 |
| 5,068,575 | 11/1991 | Dunsmore et al. | 315/241 |
| 5,072,171 | 12/1991 | Eng | 323/283 |
| 5,081,411 | 1/1992 | Walker | 323/326 |
| 5,097,196 | 3/1992 | Schoneman | 323/222 |
| 5,099,407 | 3/1992 | Thorne | 363/37 |
| 5,128,603 | 7/1992 | Wolfel | 323/282 |
| 5,130,561 | 7/1992 | Elliott et al. | 307/31 |
| 5,134,355 | 7/1992 | Hastings | 323/211 |
| 5,138,249 | 8/1992 | Capel | 323/283 |
| 5,142,217 | 8/1992 | Gontowski, Jr. | 323/272 |
| 5,144,547 | 9/1992 | Masamoto | 363/127 |
| 5,170,333 | 12/1992 | Niwayama | 363/21 |
| 5,177,676 | 1/1993 | Inam et al. | 363/80 |
| 5,182,810 | 1/1993 | Bartling et al. | 395/750 |
| 5,184,129 | 2/1993 | Fung et al. | 341/144 |
| 5,187,425 | 2/1993 | Tanikawa | 320/31 |
| 5,193,211 | 3/1993 | Nobusawa | 455/38.2 |
| 5,229,649 | 7/1993 | Nielsen et al. | 307/31 |
| 5,237,606 | 8/1993 | Ziermann | 379/413 |
| 5,260,861 | 11/1993 | Wert | 363/25 |
| 5,272,382 | 12/1993 | Heald et al. | 307/66 |
| 5,309,078 | 5/1994 | Cameron | 318/811 |
| 5,333,176 | 7/1994 | Burke et al. | 379/58 |
| 5,349,282 | 9/1994 | McClure | 320/32 |
| 5,355,077 | 10/1994 | Kates | 323/224 |
| 5,365,118 | 11/1994 | Wilcox | 327/109 |
| 5,367,247 | 11/1994 | Blocher et al. | 323/222 |
| 5,371,666 | 12/1994 | Miller | 363/98 |
| 5,376,830 | 12/1994 | Ashley et al. | 327/134 |
| 5,382,893 | 1/1995 | Dehnel | 320/32 |
| 5,396,412 | 3/1995 | Barlage | 363/89 |
| 5,402,200 | 3/1995 | Shrinkle et al. | 360/69 |
| 5,404,094 | 4/1995 | Green et al. | 323/282 |
| 5,408,150 | 4/1995 | Wilcox | 327/108 |
| 5,430,641 | 7/1995 | Kates | 363/133 |
| 5,461,301 | 10/1995 | Truong | 323/207 |
| 5,465,926 | 11/1995 | Brown | 246/34 B |
| 5,481,178 | 1/1996 | Wilcox et al. | 323/287 |
| 5,498,995 | 3/1996 | Szepesi et al. | 327/538 |
| 5,521,768 | 5/1996 | Shrinkle et al. | 360/69 |
| 5,532,524 | 7/1996 | Townsley et al. | 307/64 |
| 5,532,918 | 7/1996 | Mayranod et al. | 363/89 |
| 5,534,771 | 7/1996 | Massie | 323/285 |
| 5,539,630 | 7/1996 | Pietkiewicz et al. | 363/17 |
| 5,547,090 | 8/1996 | Schultz | 323/284 |
| 5,552,695 | 9/1996 | Schwartz | 323/271 |
| 5,569,998 | 10/1996 | Cowan | 320/21 |
| 5,576,941 | 11/1996 | Nguyen et al. | 363/21 |
| 5,596,315 | 1/1997 | Olds et al. | 340/825.03 |
| 5,600,234 | 2/1997 | Hastings et al. | 323/282 |

OTHER PUBLICATIONS

Harris Semiconductor App Note, "HIP5060 Power Control IC Single Chip Power Supply," Apr./1994 pp. 7–47–7–48.

Linear Technology Application Note 35, "Step Down Switching Regulators". Aug./1989 pp. An35–1–An35–32.

Linear Technology Corporation Data Sheet, "LT1524/LT3524 SG1425/SG3524 Regulating Pulse Width Modulator" 1990 pp. 5–85–5–92.

Linear Technology Corporation Data Sheet, "LT1432 5V High Efficiency Step–Down Switching Regultor" 1992 pp. 1–28.

Linear Technology Corporation Data Sheet, "LT1158 Half Bridge N–Channel Power MOSFET Driver" 1992 pp. 4–102–4–121.

Maxim, "Triple–Output Power–Supply Controller for Notebook Computers". May/1994 pp. 1–32.

"Maxim, Dual–Output Power–Supply Controller for Notebook Computers". May/1994 pp. 1–24.

Micro Linear, ML4873 "Battery Power Control IC" Dec./1994 pp. 1–10.

Unitrode Data Sheet, "UC1895, UC2895, UC3895 Synchronous Rectifier Buck PWM Controller," Sep./1993.

Unitrode Data Sheet, "UC1895, UC2895, UC3895 Synchronous Rectifier Buck PWM Controller," Jan./93.

Archer, "Current drives synchronous rectifer," EDN Nov./28/1995 p. 279.

Blanc, "Designing DC/DC Converters with the Si9110 Switchmode Controller" Siliconix Inc. 1991 pp. 9–61–9–77.

Blanchard, et al., "MOSFETs, Schottky Diodes vie for Low–Voltage–Supply Designs," EDN, Jun./28/1984.p. 197–205.

Borghi et al., "Discontinous Conduction Mode Power Switching Regulator IC," PCI Oct. 1998 Proceedings, pp. 31–41.

Campbell, et al., "Some Applications of A Programmable Power Switch/Amplifier" RCA Application Note ICAN–6048 1972 pp. 1–12.

Cassani,et al., "Sophisticated control IC Enhances 1MHz Current Controlled Regulator Performance" HFPC, May/1992, pp. 167–173.

Chetty, "IC timers control dc–dc converters" Electronics, Nov./13/1975 pp. 121 and 123.

Chryssis, "High–frequency switching power supplies," 1989 pp. 144–152, 180–181.

Fisher, et al., "Performance of Low Loss Synchronous Rectifiers in a Series–Parallel Resonant DC–DC Converter". APEC 89 Fourth Annual IEEE Applied Power Electronics Conference and Exposition. Mar./13–17/1989 pp. 240–246.

Gauen, "Synchronous Rectifier Improves Step–Down Converter Efficiency" PCIM Apr./1993 pp. 8–15.

Gontowsski & Neufeld, "Advanced New Integrated Circuits For Current–Mode Control," *PESC*, 1986, pp. 341–352.

Goodenough "Design Custom BICMOS Power/High Voltage Ics" Electronic Design Jul./12/1990 pp. 43–49.

Goodenough, "Dozing IC OP Amps wake up for input signal" Electronic Design. Dec./05/1991 pp. 49–54.

Goodenough "Synchronous Rectifier UPS PC Battery Life" Electronic Design Apr./16/1992 pp. 47–52.

Goodenough, "Low–Voltage Analog ICS wait in the Wings," Electronic Design, Sep./03/1992 pp. 37–51.

Gracie, "Intermittent Converter Saves Power," Electronic Design News, Sep./01/1989, p. 151.

Grant, et al., "Power Mosfets Theory and Applications" Wiley–Interscience Publication 1989 pp. 239–256.

Hnatek, "Design of Solid State Power Supplies" Third Edition,1989, pp. 65–70.

Hodgins and Wittlinger, "Harris Intelligent Power," Application Note AN9212.1 (1992), pp. 11–191–11–197.

Horowitz & Hill, "The Art of Electronics," Cambridge University Press, 1989, pp. 355–360.

Huffman, "Components, configuration, and common sense are keys to efficient regulators" EDN,Jul./22/1993 pp. 106–120.

Jamieson, "Technical Support Package on Synchronous Half–Wave Rectifier," *NASA Tech* Brief vol. 13, No.7., Item ™15, Jul./1989, pp. 1–3.

Kerridge, "Battery power breeds efficient regulators" EDN Mar./18/1993 pp. 103–108.

La Duca, et al. "Improved Single–Ended Regulated DC/DC Converter Circuit" PESC'75 IEEE Power Electronic Specialists Conference–1975 Jun./09–11/1975 pp. 177–187.

Lee et al, "Design of Switching Regulator with Combined FM and On–Off Control," *IEEE Transactions on Aerospace and Electronic Systems*, vol.AES–22, No. 6, Nov. 1986, pp. 725–731.

Lee, et al., "A 580 KHZ switching regulator using on–off control" Journal of the Institution of Electronic and Radio Engineers, vol. 57., No. 5 pp. 221–226. Sep./Oct. 1987.

Mansmann, et al., "Maximizing the Impact of Power IC's via a Time to Market CAD Driven Power ASIC Strategy" APEC'92 Seventh Annual Applied Power Electronics Conference and Epoosition Feb./23–27/1992 pp. 23–27.

Massey, et al, "High Voltage Single–Ended DC–DC Converter"PESC'77 Record IEEE Power Electronics Specialists Conference–1977 Jun./14–16/1977 pp. 156–159.

Meakin, "The LM3578 Switching Power Regulator" Electronic Engineering Jul./1986 pp. 47–52.

Myers, "200–kHz Power FET Technology in New Modular Power Supplies," Hewlett–Packard Journal, Aug./1981 pp. 3–10.

Patel, Using Bipolar Synchronous Rectifiers Improves Power Supply Efficiency, The Power Source Converence, proceedings, Nov. 27–29,1984.

Patel, "Bipolar synchronous rectifiers cut supply losses" EDN Apr./04/1985, pp. 199–204.

Quinnell, "Analog IC combines five functions for battery power management," EDN Apr./23/1992.

Redl, et al., "Frequency Stabilization and Synchronization of Free–Running Current–Mode Controlled Converters," *PESC 86 Record* pp. 519–530.

Redl et at, "Overload–Protection Methods For Switching–Mode DC/DC Converters: Classification, Analysis, and Improvements", *PESC '87 Record*, pp. 107–118.

Shepard, "Powering portable systems," EDN, Nov./05/1992 pp. 73–74.

Sokal & Redl, "Control Algorithms and Circuit Designs For Optimally Fly Back–Charging and Energy–Storage Capacitor," (e.g., for a flash lamp), *EEEE* Catalog No. Ch2853–0/90/0000/0295,1990, pp. 295–301.

Steigerwald, "High Frequency Resonant Transistor DC–DC Converters." IEEE Transaction on Industrial Electronics., vol. IE–31., No. 2., May/1984 pp. 181–191.

Taylor, "Fly Back Converter," Electronic Engineering, Jul., 1976, pp. 23.

Wilcox, "The LT1158: Low Voltage, N–Channel Bridge Design Made Easy" Linear Technology vol. II No. 1, Feb. 1992 pp. 1–5.

Williams, "Micropower circuits assist low–current signal conditioning," EDN Aug./06/1987 pp. 123–132.

Williams, et al., "Precise converter designs enhance system performance," EDN Oct./13/1988 pp. 171–185.

Williams, et al., "Proper instrumentation eases low–power DC/DC–converter design," EDN Oct./27/1988 pp. 285–291.

Williams, et al., "Design dc/dc converters for power conservation and efficiency," EDN Nov./10/1988 pp. 209–224.

Williams et al., "Switched–capacitor networks simplify dc/dc–converter designs," EDN Nov./24/1988,pp. 171–175.

Williams, "Basic principles and ingenious circuits yield stout switchers," EDN Jan./18/1990 pp. 151–166.

Williams, "Designing supplies for powering LCD backlighting," EDN Oct./29/1992 pp. 125–136.

Williams, "1.5 to 5V converter supplies 200 mA," EDN Oct./15/1992 p. 139–140.

"Using Bipolar Synchronous Rectifiers Improves Power Supply Efficiency," Unitrode Semiconductor Products, Jun./1985 pp. 12–88–12–94.

(PRIOR ART)

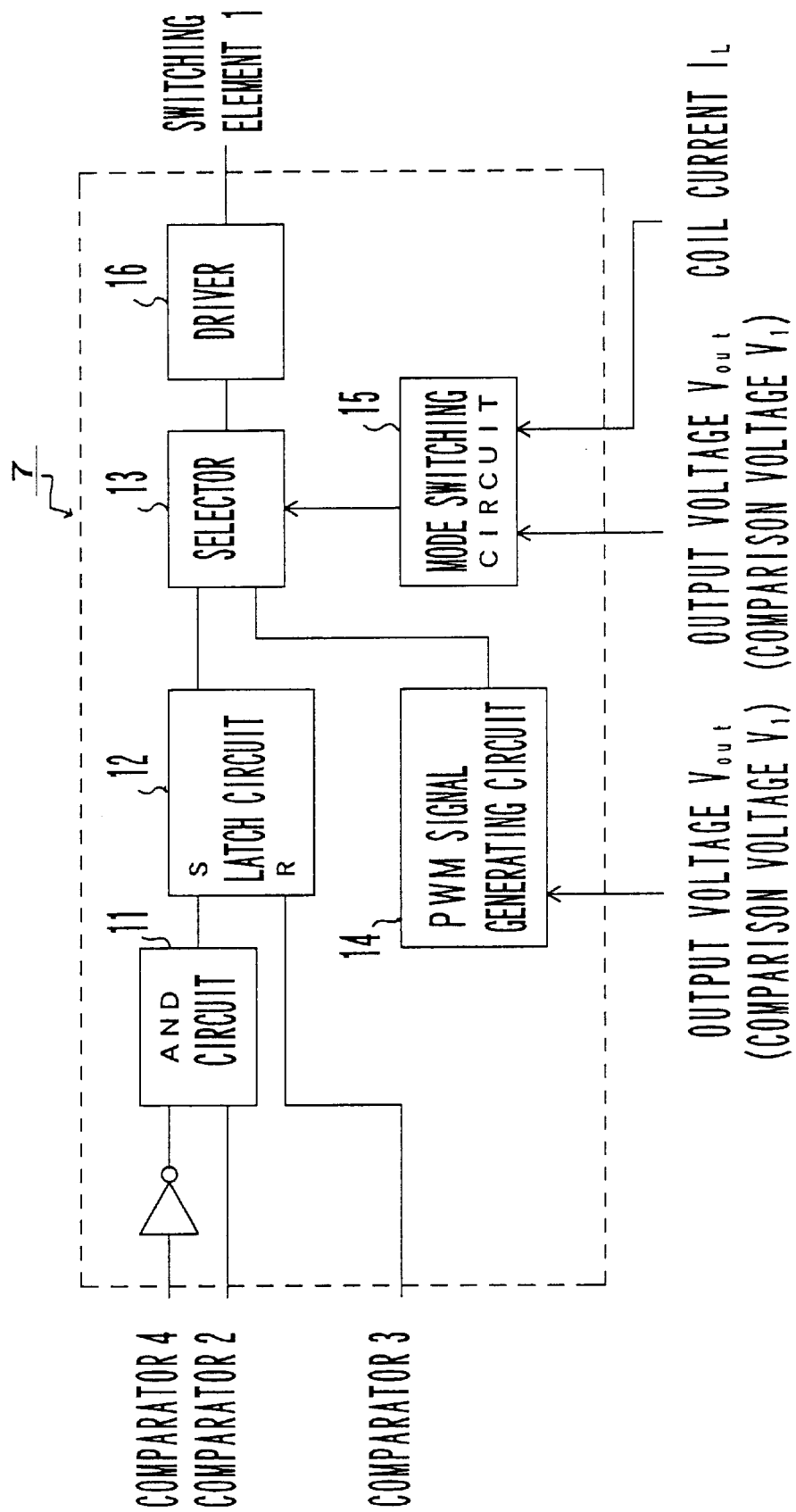
F I G. 4

DC/DC CONVERTER AND CONTROLLER THEREFOR UTILIZING AN OUTPUT INDUCTOR CURRENT AND INPUT VOLTAGE

BACKGROUND OF THE INVENTION

1. Field of the Invention

The present invention relates to a circuit for controlling a DC/DC converter and its control circuit, and more specifically to a technology of improving the efficiency of the DC/DC converter.

2. Description of the Related Art

A DC/DC converter converts an input DC voltage into different DC voltages for output in various uses. Actually, it is applied to various uses. The output voltage should be stable at a predetermined value and the power consumption of the converter should be smallest possible in consideration of the case where the converter is provided for a portable terminal unit.

FIG. 1 shows the configuration of an example of the conventional DC/DC converter. The DC/DC converter shown in FIG. 1 converts an input voltage $V_{in}$ into an output voltage $V_{out}$.

A pulse frequency modulator 101 receives the output voltage $V_{out}$ as a feedback signal, and outputs a pulse signal which is kept ON for a predetermined time at a frequency based on the output voltage. A driver 102 outputs an ON/OFF control signal according to the pulse signal received from the pulse frequency modulator 101. A switching element 103 functions as switch according to the ON/OFF control signal output by the driver 102. The switching element 103 is, for example, a P-channel MOS transistor, and is turned on when the output from the driver 102 is at an L level.

When the switching element 103 is turned on, the current passing through the switching element 103 flows through coil L, thereby providing the electric power for the capacitor C and the output terminal and raising the output voltage $V_{out}$. As a result, when the output voltage $V_{out}$ drops, the pulse frequency modulator 101 outputs a control signal to set the switching element 103 in an ON state and keeps the output voltage $V_{out}$ constant.

FIG. 2 shows the output of the pulse frequency modulator 101. In this example, the pulse signal (the period in which the H level is entered) sets the switching element 103 in an ON state.

When the load connected to the output of the DC/DC converter is small, the output voltage $V_{out}$ can be held at a reference value even if the current provided for the load is small. Therefore, the pulse frequency modulator 101 outputs pulse signals at a relatively low frequency as shown in FIG. 2A. When the load becomes large, it is necessary to provide a large current for the load so that the output voltage $V_{out}$ can be held at a reference value, and therefore the pulse frequency modulator 101 increases the frequency of the ON state of the switching element 103 with the pulse frequency kept high as shown in FIG. 2B. As described above, the DC/DC converter keeps the output voltage $V_{out}$ at a constant value.

However, when the DC/DC converter is used for, for example, a portable terminal unit, etc., the power consumption should be reduced to the lowest possible level to prolong the operation time (durability of the battery) of the terminal unit. However, the above described conventional DC/DC converter has not been successfully developed as a power saving unit.

That is, considering the DC/DC converter loaded onto a portable terminal unit, etc., the DC/DC converter is necessarily small. In this case, the above described capacitor C and coil L should be small. To make the capacitor C and coil L small, it is necessary to raise the frequency of an oscillator (built in the pulse frequency modulator 101 as shown in FIG. 1) for generating pulse signals to control the switching element 103 as high as several hundred KHz.

Thus, if the frequency of the operation of an oscillator is raised, the power provided at a single pulse is reduced, thereby increasing the number of pulses required to provide a predetermined amount of power for the load. Since the pulse refers to a signal to turns on or off the switching element 103, the switching frequency of the switching element 103 is necessarily raised when the frequency of the operation of the oscillator is raised. Since a loss accompanies the operation of the switching element 103, the conversion efficiency is lowered with the increasing frequency of a switching operation through the switching element 103.

With the above described configuration, an oscillator is required (built in the pulse frequency modulator 101). Since the oscillator is constantly in the operating state, it also prevents the successful reduction of the power consumption. Furthermore, if the frequency of a pulse is altered as described above, the ripple of the output voltage $V_{out}$ becomes inconstant.

Thus, the conventional DC/DC converter has not been developed as a power saving unit.

SUMMARY OF THE INVENTION

The present invention has been developed to solve the above described problem, and aims at improving the conversion efficiency of the DC/DC converter by designing it as a power saving unit.

The DC/DC converter according to the present invention is designed to control the output voltage by altering the coil current, and includes the following units.

An output voltage monitor unit sets the switching unit in the ON state when the output voltage of the DC/DC converter drops to a predetermined voltage value. The output voltage monitor unit sets the switching unit in the OFF state when the coil current rises to the reference current value.

The following two methods are followed to set the reference current value. That is, the method of setting a desired value, and the method of setting the value based on the input voltage of the DC/DC converter.

In the method of setting the reference value based on the input voltage, the reference current value used by the coil current monitor unit in the monitoring process changes with the input voltage of the DC/DC converter. Therefore, the alteration of the input voltage has a smaller influence on the control of the switching unit, thereby stabilizing the operation of the DC/DC converter.

In the method of setting an optional value, the maximum value of the current for supply to the load can be optionally set. With the DC/DC converter operating in at least a light load mode and a heavy load mode as operation modes in which an electric power is provided for a load to supply the load with an electric power to control a switching unit in the method corresponding to each of the operation modes, the above described reference value is set in a way that the power conversion efficiency can be maximized in each operation mode when the operation mode is switched from the light load mode to the heavy load mode.

BRIEF DESCRIPTION OF THE DRAWINGS

FIG. 4 is a block diagram showing the concept of realizing the function of the control circuit;

DETAILED DESCRIPTION OF THE INVENTION

The embodiments of the present invention are described by referring to the attached drawings.

Figure 1:
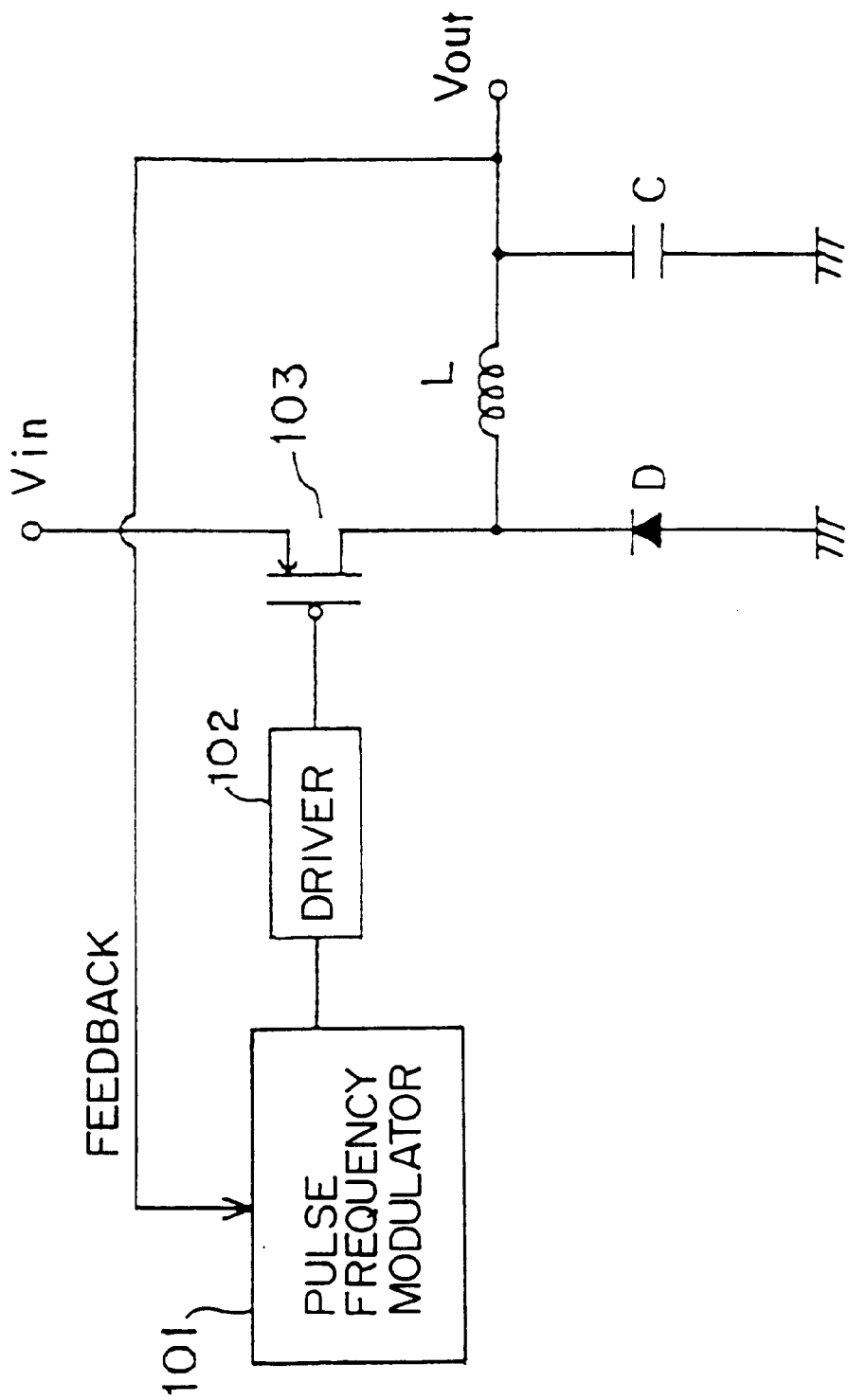
FIG. 1 shows the configuration of the conventional DC/DC converter.
Figure 2A:
FIGS. 2A and 2B show the output from the pulse frequency modulator shown in FIG. 1.
Figure 2B:
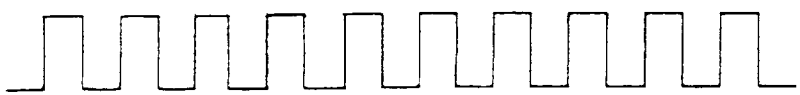
Figure 3:
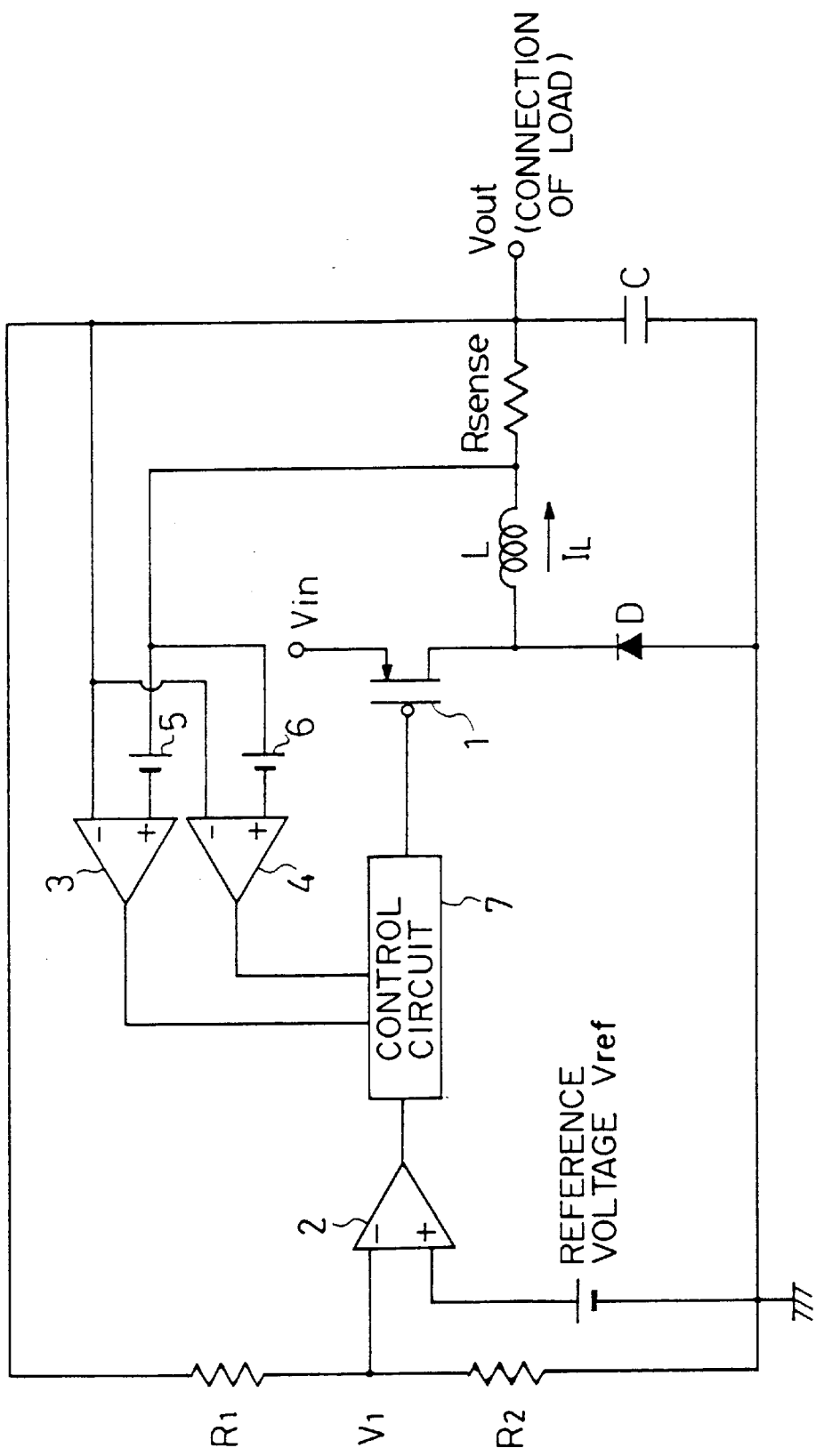
FIG. 3 shows the configuration of an example of the DC/DC converter according to the present invention.

FIG. 3 shows an example of the DC/DC converter according to the present embodiment. The DC/DC converter generates an output voltage $V_{out}$ from an input voltage $V_{in}$ while automatically switching the operation mode depending on the connected load. That is, when the load is light and a predetermined output voltage is maintained even if the current provided for the load is small, the DC/DC converter is operated in the light load mode. When the load is heavy and a predetermined output voltage cannot be maintained in the light load mode, the DC/DC converter is operated in the heavy load mode. The operation modes will be explained referring to FIG. 4.

A switching element 1 is, for example, a P-channel power MOS transistor to one terminal of which an input voltage $V_{in}$ is applied, and to the other terminal of which the cathode of a diode D and a coil L are connected. The anode of the diode D is grounded. The other end of the coil L is connected to the output terminal through a resistance R sense. The output terminal is grounded through a capacitor. The switching element 1 enters the ON state when the output from the control circuit 7 indicates the L level. When the switching element 1 enters the On state, the coil current $I_L$ to be provided for the load ramps up.

The reference voltage Vref is applied to the positive terminal of a comparator 2. The comparison voltage V1 obtained by dividing the output voltage $V_{out}$ by resistances R1 and R2 is applied to the negative terminal of the comparator 2. The comparator 2 outputs the comparison result to a control circuit 7.

The comparison levels of comparators 3 and 4 are set by offset setting power sources 5 and 6 respectively. The voltage drop in the resistance $R_{sense}$ is monitored based on the comparison result. In this embodiment, the current flowing through the resistance $R_{sense}$ is the coil current $I_L$. Therefore, the comparators 3 and 4 monitor the coil current $I_L$. The comparison levels set for the comparators 3 and 4 are set as $I_{LP}$ and $I_{LB}$ ($I_{LP}$>$I_{LB}$) respectively, when converted into coil currents. The current $I_{LP}$ is the upper limit of the coil current $I_L$ in the light load mode, and is referred to as the peak current $I_{LP}$. The current $I_{LB}$ is the lower limit of the coil current $I_L$ in the light load mode, and is referred to as the minimum current $I_{LB}$. The minimum current $I_{LB}$ is set to, for example, 0 (zero).

The comparator 3 indicates the H level when the coil current $I_L$ becomes larger than (or equal to) the peak current $I_{LP}$. The comparator 4 indicates the L level when the coil current $I_L$ becomes smaller than (or equal to) the minimum current $I_{LB}$. The outputs from the comparators 3 and 4 are provided for the control circuit 7.

When the control circuit 7 operates in the light load mode, it controls the ON/OFF state of the switching element 1 based on the signals received from the comparators 2, 3, and 4. Practically, the following control is performed in steps A through C. Step A: The switching element 1 is set in the ON state when the output from the comparator 2 changes from the L level to the H level (when the output voltage $V_{out}$ drops down a predetermined voltage). Step B: The switching element 1 is set in the OFF state when the output from the comparator 3 changes from the L level to the H level after step A above (when the coil current $I_L$ becomes larger than the peak current $I_{LP}$). Step C: When the output from the comparator 4 changes from the H level to the L level after step B above (when the coil current $I_L$ drops down to the minimum current $I_{LB}$), control is returned to step A above and the output signal from the comparator 2 is monitored.

The control circuit 7 controls the ON/OFF state of the switching element 1 by controlling the pulse width modulation (PWM) in which the output voltage $V_{out}$ is used as a feedback signal when is operated in the heavy load mode as described later.

FIG. 4 shows an example of the block diagram showing the concept of the circuit for performing the function of the control circuit 7. The output from the comparator 2 is input to one input terminal of an AND circuit 11. The inverse signal of the output from the comparator 4 is input to the other input terminal of the AND circuit 11. The output of the AND circuit 11 is input to the set terminal of a latch circuit 12. Therefore, if the output from the comparator 2 indicates the H level (if the output voltage $V_{out}$ is lower than a predetermined voltage) when the output from the comparator 4 indicates the L level (when the coil current $I_L$ drops to the minimum current $I_{LB}$), then the latch circuit 12 is set. The output from the comparator 3 is applied to the reset terminal of the latch circuit 12. Therefore, if the output from the comparator 3 indicates the H level (if the coil current $I_L$ becomes larger than the peak current $I_{LP}$), then the latch circuit 12 is reset. The output from the latch circuit 12 is applied to one input terminal of the selector 13.

The output from a PWM signal generating circuit 14 is applied to the other input terminal of a selector 13. The PWM signal generating circuit 14 outputs pulse signals on a duty cycle depending on the input and the output voltage $V_{out}$. The selector 13 selects either the output from the latch circuit 12 or the output from the PWM signal generating circuit 14 at the instruction from a mode switching circuit 15. The mode switching circuit 15 determines the operation mode depending on the load current, and instructs the selector 13 to select the output from the latch circuit 12 in the light load mode and select the output from the PWM signal generating circuit 14 in the heavy load mode.

A driver 16 drives the switching element 1 based on the output from the selector 13. That is, the driver 16 sets the switching element 1 in the ON state by outputting the L level signal when the output from the selector 13 indicates the H level. The driver 16 sets the switching element 1 in the OFF state by outputting the H level signal when the output from the selector 13 indicates the L level.

With the configuration shown in FIG. 4, the PWM signal generating circuit 14 is provided as a circuit for generating a signal for use in controlling the switching element 1 in the heavy load mode. However, the present invention is not limited to this application. For example, the AND circuit 11 can be opened or closed in the light load mode according to the output from the comparator 4, and the output of the comparator 2 can always pass through the AND circuit 11 by suppressing the output from the comparator 4 in the heavy load mode without mounting the selector 13 and the PWM signal generating circuit 14.

Figure 5A:
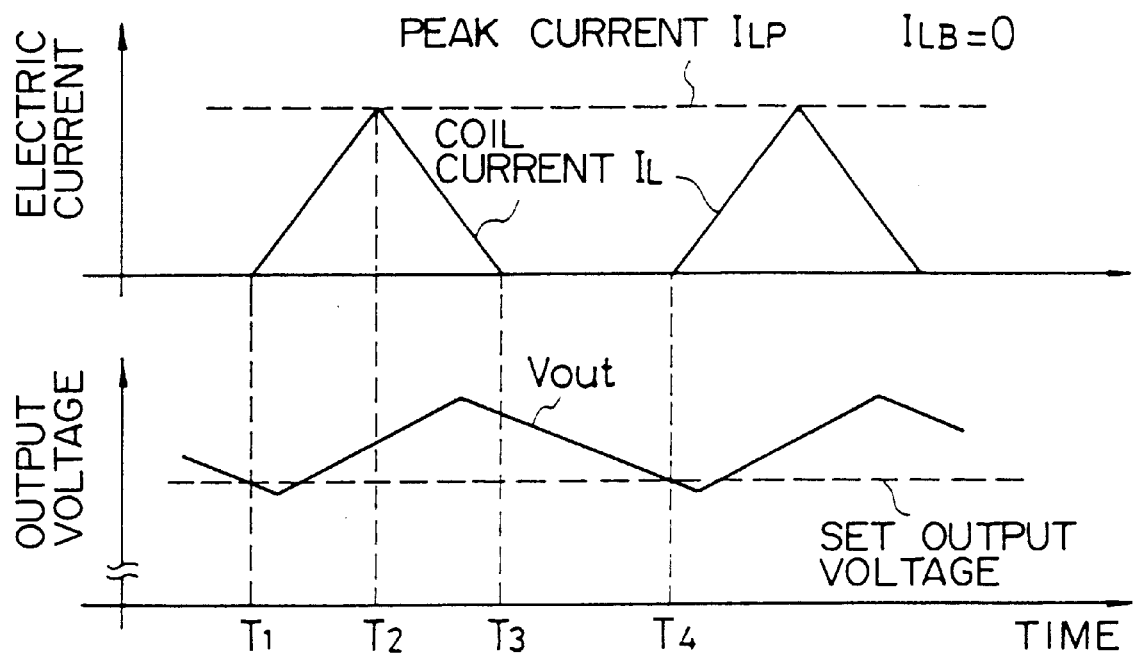
FIG. 5A shows the operation of the DC/DC converter with a light load.

Described below is the operation of the DC/DC converter in the light load mode shown in FIG. 3. FIG. 5A shows an example of the operation performed when the load is light. When the output voltage $V_{out}$ becomes smaller than a predetermined output voltage at time T1, then the control circuit 7 sets the switching element 1 in the ON state (step A above). When the switching element 1 enters the ON state, the coil current $I_L$ ramps up and the output voltage $V_{out}$ rises. If the coil current $I_L$ increases and reaches the peak current $I_{LP}$ at time T2, then the control circuit 7 sets the switching element 1 in the OFF state (step B above). When the switching element 1 enters the OFF state, the coil current $I_L$ ramps down and the output voltage $V_{out}$ drops correspondingly. At this time, since the load is light and the load current is small, the output voltage $V_{out}$ gradually drops.

When the coil current $I_L$ reaches the minimum current $I_{LB}$ at time T3, the control circuit 7 starts monitoring the output voltage $V_{out}$ (step C above). When the output voltage $V_{out}$ reaches the predetermined output voltage at time T4, the operations at the above described time T1 through T3 are repeated. Thus, the output voltage $V_{out}$ maintains a constant value.

Figure 5B:
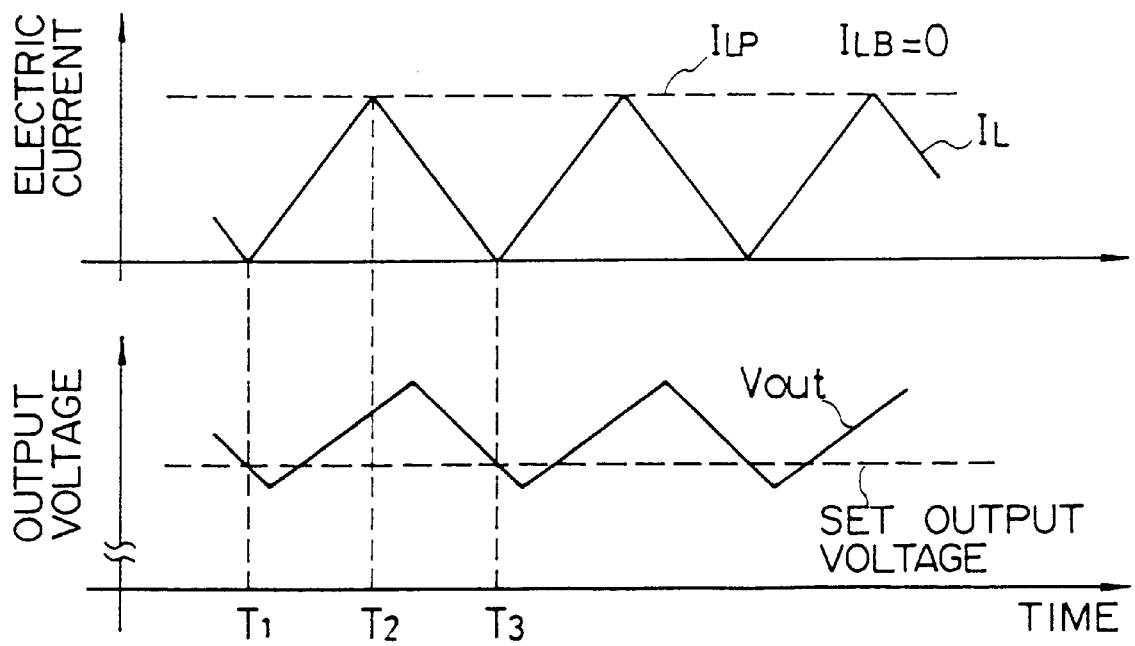
FIG. 5B shows the operation of the DC/DC converter with a little heavy load.

FIG. 5B shows an example of the operations performed when the load is a little heavier than the load in the example shown in FIG. 5A. The operations at time T1 and T2 are the same as those of the example shown in FIG. 5A. When the switching element 1 enters the OFF state at time T2, the coil current $I_L$ ramps down and the output voltage $V_{out}$ drops. In the example shown in FIG. 5B, the load is a little heavier than the load in the example shown in FIG. 5A. Therefore, the output voltage $V_{out}$ drops a little more abruptly.

At time T3, the coil current $I_L$ drops to the minimum current $I_{LB}$. If, at this time, the output voltage $V_{out}$ has reached the predetermined output voltage, then the operations at the above described time T1 through T3 are immediately repeated to control the coil current $I_L$, thereby maintaining the output voltage $V_{out}$ at a constant value.

In the example shown in FIG. 5B, the cycle of providing the coil current $I_L$ (operations at time T1 through T3) is incessantly repeated. Assuming that the minimum current $I_{LB}$ is 0 in this state, the mean value of the coil current $I_L$ is $I_{LP}/2$. This value is the maximum value of the current that can be provided for the load in the light load mode.

Figure 6:
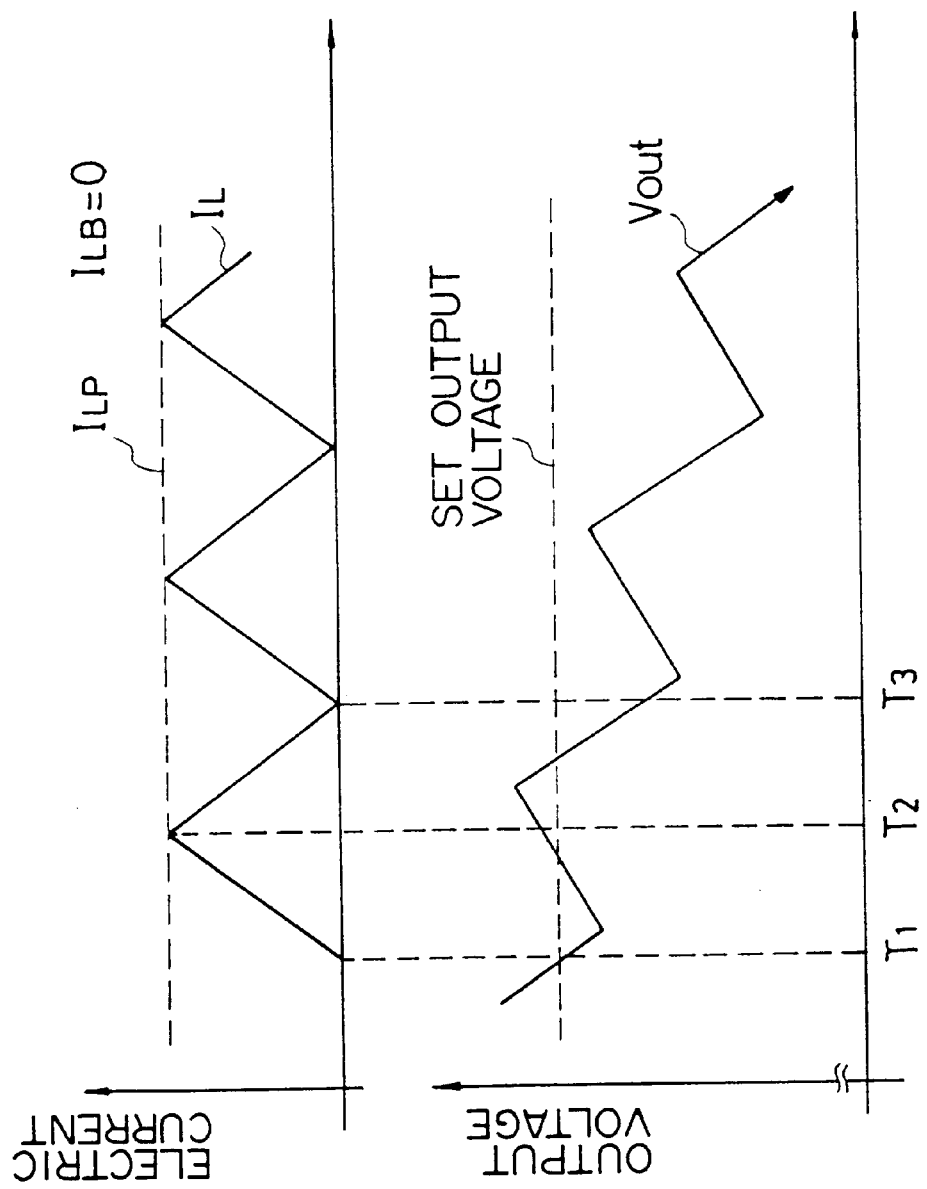
FIG. 6 shows the operation of the DC/DC converter shown in FIG. 3 with a heavy load.

FIG. 6 shows an example of the operation performed when the load is heavy. The operations at time T1 and T2 are the same as those in the example shown in FIG. 5A. When the switching element 1 enters the OFF state at time T2, the output voltage $V_{out}$ drops abruptly because the load is heavy and consumes much current. Afterwards, when the coil current $I_L$ drops to the minimum current $I_{LB}$ at time T3, the output voltage $V_{out}$ is smaller than the predetermined output voltage. Therefore, the current supply cycle is immediately followed.

However, in the example shown in FIG. 6, the load demands a current larger than $I_{LP}/2$ and the load current cannot be obtained even by providing the maximum current ($I_{LP}/2$) to be provided for the load in the light load mode by repeating the current supply cycle continuously. Therefore, the output voltage $V_{out}$ drops without maintaining the predetermined output voltage. If the state in which the output voltage $V_{out}$ is smaller than the predetermined output voltage continues for longer than a predetermined time, then the operation mode of the DC/DC converter is automatically switched from the light load mode to the heavy load mode.

The operations in the heavy load mode are briefly described below. The output voltage $V_{out}$ is controlled based on the pulse width modulation (PWM) in the heavy load mode. The pulse signal is generated based on the output voltage $V_{out}$, and the pulse width corresponds to the time when the switching element 1 is turned on. That is, the output voltage $V_{out}$ is controlled by altering the duty cycle of the pulse signals to alter the ratio of the period in which the switching element 1 is in the ON state to the period in which the switching element 1 is in the OFF state.

When the output voltage $V_{out}$ is lower than a predetermined voltage, the ratio of the period in which the switching element 1 is in the ON state is transitionally increased to rise the output voltage $V_{out}$. On the other hand, when the output voltage $V_{out}$ is higher than the predetermined voltage, the ratio of the period in which the switching element 1 is in the ON state is transitionally decreased to drop the output voltage $V_{out}$. In each case, the switching element 1 is driven by the pulse signals on a duty cycle depending on the ratio of the output voltage $V_{out}$ to the input voltage $V_{in}$ after the output voltage $V_{out}$ has reached back the predetermined voltage. Under such control in the heavy load mode, the output voltage $V_{out}$ is maintained at the predetermined value.

As described above, the DC/DC converter according to the present embodiment is operated in a light load mode and a heavy load mode. In the light load mode, the output voltage $V_{out}$ is controlled using the coil current $I_L$, but the coil current $I_L$ depends on the peak current $I_{LP}$. That is, the maximum value of the coil current $I_L$ is the peak current $I_{LP}$, and the maximum value of the mean value (current provided for the load) of the coil current $I_L$ is $I_{LP}/2$ with the minimum current $I_{LB}$ set to 0. If the load requires a load current larger than $I_{LP}/2$, then the operation mode of the DC/DC converter is switched from the light load mode to the heavy load mode.

The DC/DC converter is used under various conditions. For example, it may be connected to a load driven by 5 V or a load driven by 3 V. If the DC/DC converter is connected to a load driven by 5 V, then the output voltage of the DC/DC converter is set to 5 V. If the DC/DC converter is connected to a load driven by 3 V, then the output voltage of the DC/DC converter is set to 3 V. The conditions (normally based on the load) under which the operating states of the DC/DC converter are hereinafter referred to as "applications".

Figure 7:
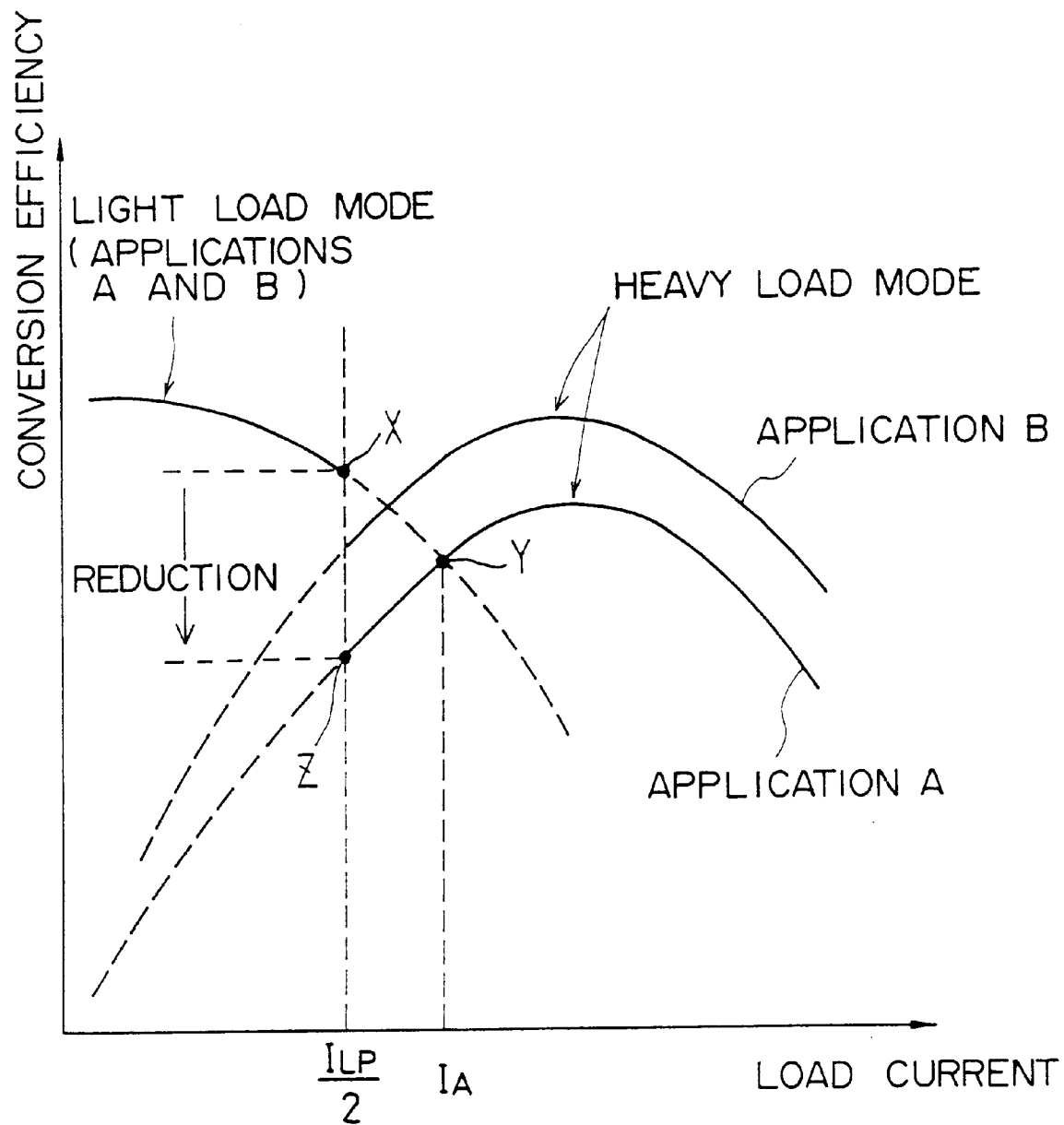
FIG. 7 shows the conversion efficiency of a DC/DC converter.

FIG. 7 shows the conversion efficiency of the DC/DC converter. The conversion efficiency refers to the ratio of an output power to an input power. FIG. 7 shows the electric power conversion efficiency in the light load mode and the heavy load mode for applications A and B. Applications A and B are loads driven by 3 V and 5 V respectively.

As described above, the switching point in an operation mode is obtained when the load current indicates $I_{LP}/2$. When the load current is equal to or smaller than $I_{LP}/2$, the DC/DC converter is operated in the light load mode while it is operated in the heavy load mode when the load current is equal to or larger than $I_{LP}/2$.

In the light load mode, a high conversion efficiency can be obtained especially when the load current is small. In this mode, the conversion efficiency is independent of applications if the input voltage $V_{in}$ is constant. In FIG. 7, the conversion efficiency curves corresponding to applications A and B match each other in the area where the load current is equal to or smaller than $I_{LP}/2$. In the heavy load mode, the conversion efficiency depends on the applications. In the example shown in FIG. 7, the conversion efficiency on application A is lower than the conversion efficiency on application B.

The curve of the conversion efficiency to the load current can be predicted by a simulation, etc. in both light and heavy load modes if an application is selected.

As shown in FIG. 7, a high conversion efficiency can be obtained when the load current is small and the DC/DC converter is operated in the light load mode. That is, there is a small power loss in the light load mode. If the load current increases and exceeds $I_{LP}/2$, then the operation mode of the DC/DC converter enters the heavy load mode. However, the conversion efficiency in the heavy load mode depends on applications. For example, in application A, the conversion efficiency obtained when the load current is $I_{LP}/2$ is considerably low. Thus, when the load current increases and the operation mode is switched from the light load mode to the heavy load mode, the electric power conversion efficiency is considerably lowered. That is, when the load current exceeds $I_{LP}/2$ as shown in FIG. 7, the conversion efficiency is lowered from X to Z. Thus, the conversion efficiency is considerably lowered at a switching point from the light load mode to the heavy load mode depending on the application.

To minimize the reduction of the conversion efficiency at the switching point in the operation mode, the operation mode can be switched when the load current indicates $I_A$ in, for example, application A. That is, if the switching point of the operation mode is set at $I_A$, the conversion efficiency is expressed by the curve X–Y (indicated by broken lines) in the load current range from $I_{LP}/2$ to $I_A$. If the switching point of the operation mode is set at $I_{LP}/2$, the conversion efficiency within the range of the current is expressed by the curve Z–Y. Therefore, in application A, a higher conversion efficiency can be obtained with the switching point of the operation mode set at $I_A$.

With the DC/DC converter shown in FIG. 3, the switching point of the operation mode depends on the peak current $I_{LP}$ which determines the coil current in the light load mode. If the peak current $I_{LP}$ can be set corresponding to an application, a high conversion efficiency can be obtained in all current areas. The DC/DC converter which can be set depending on an application is described later.

Figure 8:
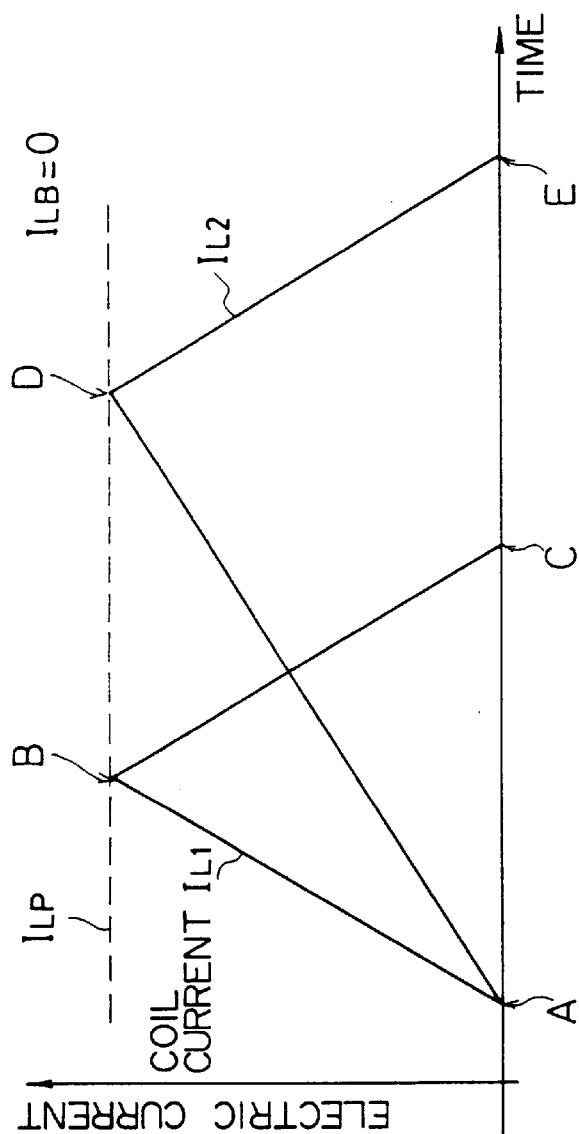
FIG. 8 shows the relationship between the change in an input voltage and a coil current.

FIG. 8 shows the relationship between the change in the input voltage $V_{in}$ and the coil current $I_L$. The coil current $I_L$ depends on the input voltage $V_{in}$, the output voltage $V_{out}$, and the coil constant L. It increases at a slope in proportion to the value $(V_{in}-V_{out})/L$ when the switching element 1 is in the ON state, and decreases at a slope in proportion to the value $-V_{out}/L$ through an inverse magnetoelectric force when the switching element 1 is in the OFF state.

Therefore, when the input voltage $V_{in}$ becomes low (with the output voltage $V_{out}$ set constant), the rising slope of the coil current becomes small. Hereinafter, $I_{L1}$ refers to the coil current when the input voltage $V_{in}$ is high, and $I_{L2}$ refers to the coil current when the input voltage $V_{in}$ is low.

In FIG. 8, the area of the triangle (ABC or ADE) formed by the coil current $I_{L1}$ or $I_{L2}$ indicates the electric charge provided for the load on one power supply cycle. If the input voltage $V_{in}$ becomes low, the electric charge provided for the load on one cycle increases. If the electric charge provided for the load is larger than the electric charge required by the load, then the excess electric charge is accumulated in a capacitor C and raises the output voltage $V_{out}$. The change in the output voltage $V_{out}$ is referred to as a ripple. Therefore, the ripple becomes large when the input voltage $V_{in}$ to the DC/DC converter is low. This is one of problems to be solved by this present invention.

Another problem to be solved is as follows. As described above, when the input voltage $V_{in}$ becomes low, the electric charge provided for the load on one electric power supply cycle increases. On the other hand, if the load current is small, the electric charge required by the load is small. As a result, if the input voltage $V_{in}$ drops when the load current is small, the following state can be entered.

Figure 9:
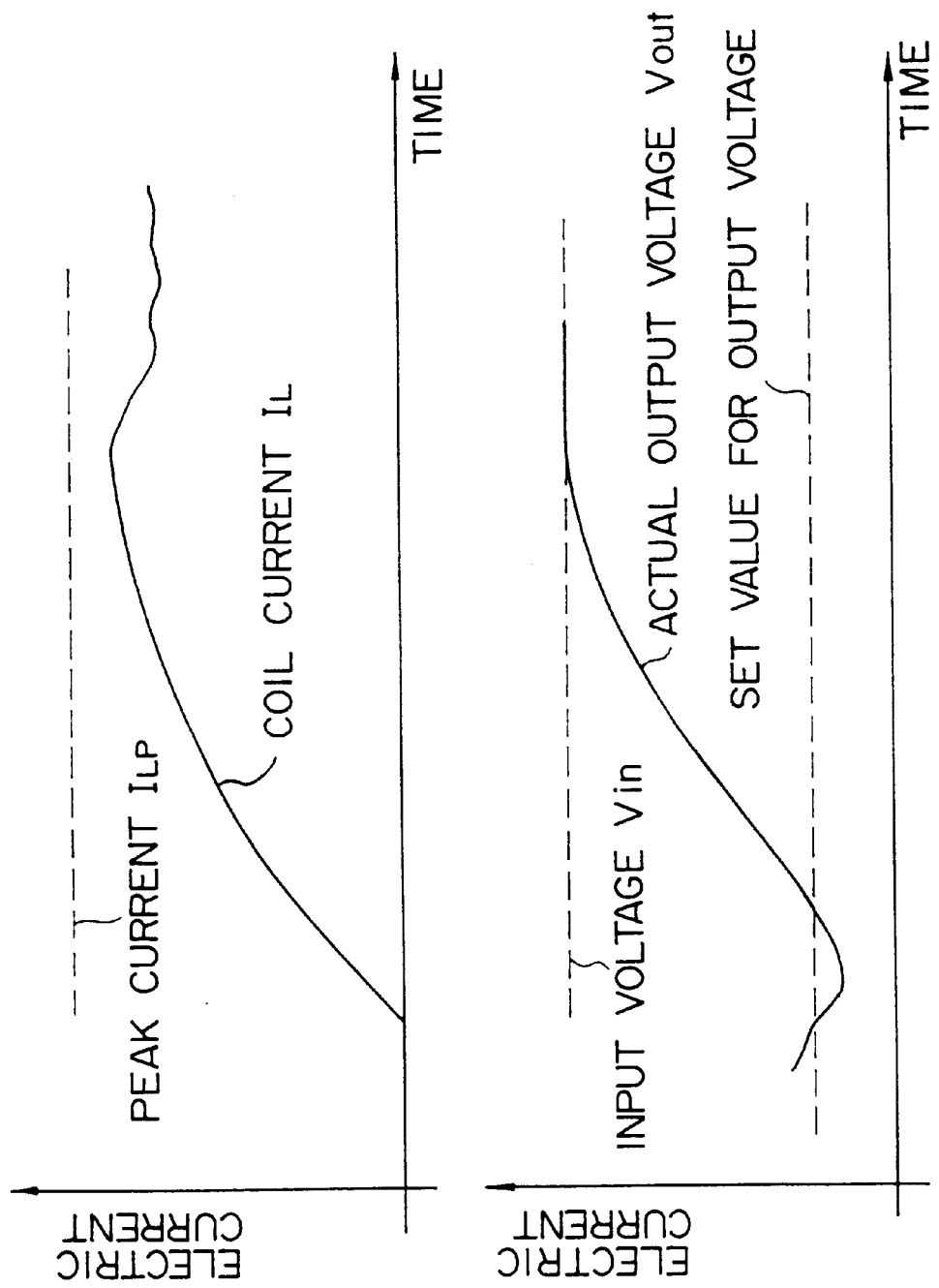
FIG. 9 shows the operation when the input voltage $V_{in}$ becomes low and when the load current is small.

FIG. 9 shows the state in which the input voltage $V_{in}$ becomes lower when the load current is small. When the output voltage $V_{out}$ is lower than a predetermined output voltage value in FIG. 9, the switching element 1 enters the ON state and the coil current $I_L$ increases. At this time, since the coil current $I_L$ gradually increases, the coil current $I_L$ does not reach the peak current $I_{LP}$ when the electric charge required by the load has been provided. The switching element 1 is controlled such that it returns to the OFF state when the coil current $I_L$ reaches the peak current $I_{LP}$. That is, since the switching element 1 maintains the ON state until the coil current $I_L$ reaches the peak current $I_{LP}$. As a result, the excess charge which has not been consumed by the load is accumulated in the capacitor C, and the output voltage $V_{out}$ may continue rising until the output voltage $V_{out}$ matches the input voltage $V_{in}$.

In this state, the coil current $I_L$ keeps resonant at a resonant frequency depending on the inductance of the coil L and the capacitance of the capacitor C, and finally reaches the value of the load current (if the load current is constant). That is, since the value of the coil current is fixed to a constant value, the output voltage cannot be controlled using the coil current. At this time, the output voltage $V_{out}$ is fixed to a value of the input voltage $V_{in}$ until the power source of the DC/DC converter is turned off. That is, a desired output voltage $V_{out}$ cannot be generated.

To avoid the above described state, the peak current $I_{LP}$ on which the coil current of the light load mode depends should also be changed with the input voltage $V_{in}$. That is, when the input voltage $V_{in}$ becomes low, the peak current $I_{LP}$ on which the coil current of the light load mode depends is changed correspondingly. The DC/DC converter capable of optionally setting the peak current $I_{LP}$ is described later.

Figure 10:
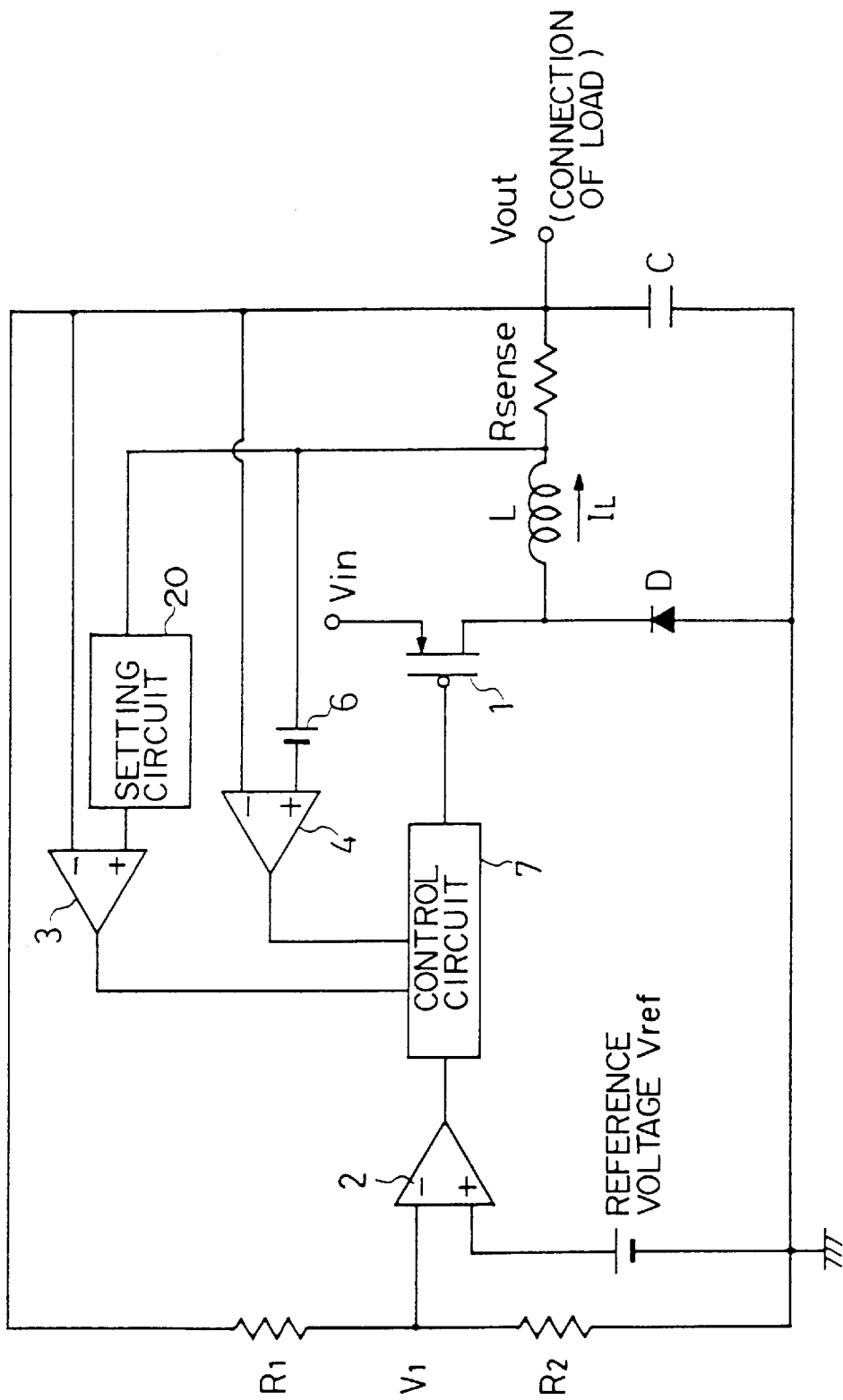
FIG. 10 shows the basic configuration of another aspect of the DC/DC converter according to the present invention.

FIG. 10 shows the basic configuration of another embodiment of the DC/DC converter according to the present invention. The DC/DC converter converts the input voltage $V_{in}$ into the output voltage $V_{out}$. In FIG. 10, some symbols are also shown in FIG. 3 to identify the corresponding units.

The DC/DC converter shown in FIG. 10 is designed to replace the offset setting power source 5 of the DC/DC converter shown in FIG. 3 with a setting circuit 20. The offset setting power source 5 sets a fixed offset voltage, but the setting circuit 20 described later in detail can set an offset which changes with the input voltage $V_{in}$, or an optional offset.

As described above, the comparators 3 and 4 monitors the coil current $I_L$. That is, the comparator 3 monitors the coil current $I_L$ by monitoring the drop of the voltage in the resistance $R_{sense}$ using the comparison level set by the setting circuit 20. The comparison level monitored by the comparator 3 is represented as $I_{LP}$ through conversion into the coil current. The current $I_{LP}$ is the upper limit of the coil current $I_L$ in the light load mode, and is hereinafter referred to as the peak current $I_{LP}$. The peak current $I_{LP}$ depends on the offset determined by the setting circuit 20, changes with the input voltage $V_{in}$ according to the aspect shown in FIG. 11, and can be set at an optional value according to the aspect shown in FIG. 13.

As described above by referring to FIG. 3, the comparator 4 monitors the coil current $I_L$ using the comparison level set by the offset setting power source 6. This comparison level is converted into the coil current and represented by $I_{LB}$ ($I_{LP}>I_{LB}$). $I_{LB}$ is the lower limit of the coil current $I_L$ in the light load mode, an is referred to as the minimum current $I_{LB}$. The $I_{LB}$ can be, for example, 0 (or a value a little larger than 0).

The operations of the comparators 3 and 4 are the same as those of the DC/DC converter shown in FIG. 3. That is, the comparator 3 indicates the H level when the coil current $I_L$ becomes larger than (or equal to) the peak current $I_{LP}$. The comparator 4 indicates the L level when the coil current $I_L$ becomes smaller than (or equal to) the minimum current $I_{LB}$.

The operations of the DC/DC converter are the same as those shown in FIG. 3. However, the DC/DC converters are different in the peak current $I_{LP}$ to monitor the coil current $I_L$ in the light load mode.

In the light load mode, the coil current $I_L$ increases when the switching element 1 is in the ON state and the output voltage $V_{out}$ rises. When the coil current $I_L$ increases and reaches the peak current $I_{LP}$, the control circuit 7 set the switching element 1 in the OFF state. The peak current $I_{LP}$ is set by the setting circuit 20. When the switching element 1 enters the OFF state, the coil current $I_L$ is reduced and the output voltage $V_{out}$ drops. If the coil current $I_L$ drops to the minimum current $I_{LB}$, the control circuit 7 monitors the output voltage $V_{out}$. When the output voltage $V_{out}$ reaches a predetermined output voltage, the switching element 1 enters the ON state. The output voltage $V_{out}$ maintains a constant value (the predetermined output voltage) by repeating the above described operations.

The operations of switching the operation mode from the light load mode to the heavy load mode are the same as those of the DC/DC converter shown in FIG. 3. That is, the load current cannot be satisfied even if the peak current ($I_{LP}/2$) is provided for the load in the light load mode. The operation mode of the DC/DC converter is switched from the light load mode to the heavy load mode when a state in which the output voltage $V_{out}$ is lower than a predetermined voltage for a time longer than a predetermined period.

Figure 11:
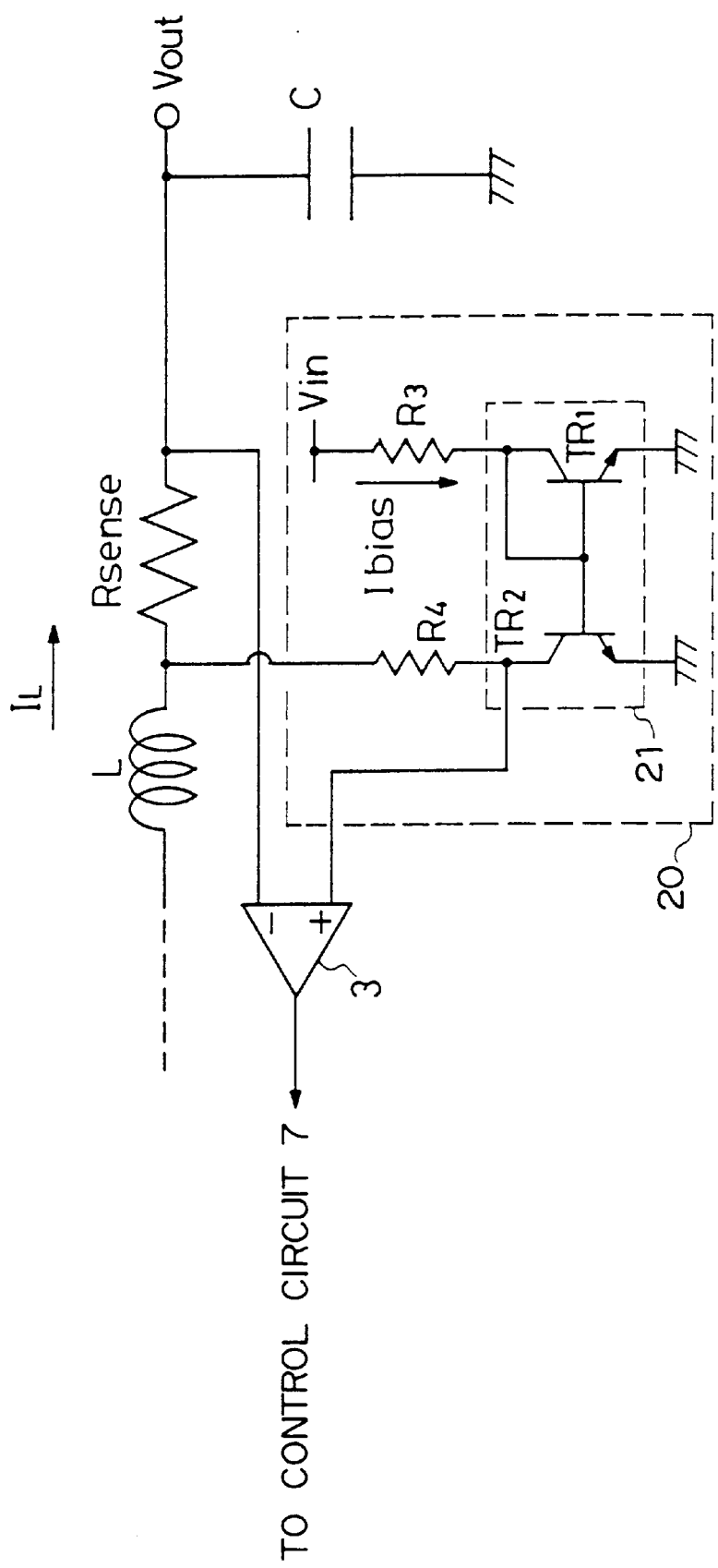
FIG. 11 shows the configuration of the important portion of the first embodiment of the DC/DC converter according to the present invention.

FIG. 11 shows an important portion of the configuration of the first aspect of the DC/DC converter according to the present embodiment of the present invention. This DC/DC converter obtains the peak current $I_{LP}$ that changes with the input voltage $V_{in}$ in the setting circuit 20, and controls the output voltage $V_{out}$ by comparing the obtained peak current $I_{LP}$ with the coil current $I_L$. FIG. 11 shows the configuration in which the peak current $I_{LP}$ is generated in proportion to the input voltage $V_{in}$.

It is well known that, when a predetermined electric current flows through transistor TR1, the same ampere of the electric current flows through transistor TR2 (when the ratio of transistor TR1 to transistor TR2 is 1:1) in a current mirror circuit 21. The input voltage $V_{in}$ is applied to transistor TR1 at the input terminal of the current miller circuit 21 through resistance R3. Transistor TR2 at the output terminal is connected to the input terminal of resistance $R_{sense}$ (the input terminal refers to the input side of the DC/DC converter) through resistance R4, and to the positive input terminal of the comparator 3.

With the above described configuration, the electric current flowing through the current mirror circuit 21 (hereinafter referred to as a bias current I bias) can be represented as follows.

$$\text{I bias}=(V_{in}-V_{BE})/R3=V_{in}/R3 \ldots \quad (1)$$

where $V_{BE}$ indicates the potential difference between the base and emitter of transistor TR1 or TR2, and is ignored because it is much smaller than the input voltage $V_{in}$. The detailed explanation is omitted here, but a circuit for compensating the $V_{BE}$ (commonly known) can also be provided.

The voltages (expressed by $\Delta V_{R4}$) at both ends of resistance R4 are the offset voltages of the comparator 3, and can be expressed as follows.

$$\Delta V_{R4}=R4 \cdot \text{I bias}=(R4/R3) \cdot V_{in} \ldots \quad (2)$$

If the voltages at both ends of resistance $R_{sense}$ when the coil current $I_L$ reaches the peak current $I_{LP}$ are represented by $\Delta V_{sense}$, the following equation is expressed.

$$\Delta V_{sense}=R_{sense} \cdot I_{LP} \ldots \quad (3)$$

The following relationship is obtained by the above listed equations (2) and (3).

$$I_{LP} = \frac{R_4}{R_{sense} \cdot R_3} \cdot V_{in} \quad (4)$$

Thus, the peak current $I_{LP}$ is generated in proportion to the input voltage $V_{in}$. The proportional coefficient is set by resistances R3, R4, and $R_{sense}$ as expressed by equation (4).

If the peak current $I_{LP}$ on which the upper limit of the coil current $I_L$ depends is set in proportion to the input voltage $V_{in}$, then the following effect can be obtained.

That is, since the coil current $I_L$ increases in proportion to the value ($V_{in}-V_{out}$)/L when the switching element 1 is in the ON state as described by referring to FIG. 8, the lower the input voltage $V_{in}$ becomes, the more gradually the increment slope of the coil current $I_L$ grows with the output voltage $V_{out}$ kept constant. However, with the DC/DC converter shown in FIG. 11, the lower the input voltage $V_{in}$ becomes, the smaller the peak current $I_{LP}$ becomes proportionally.

Figure 12:
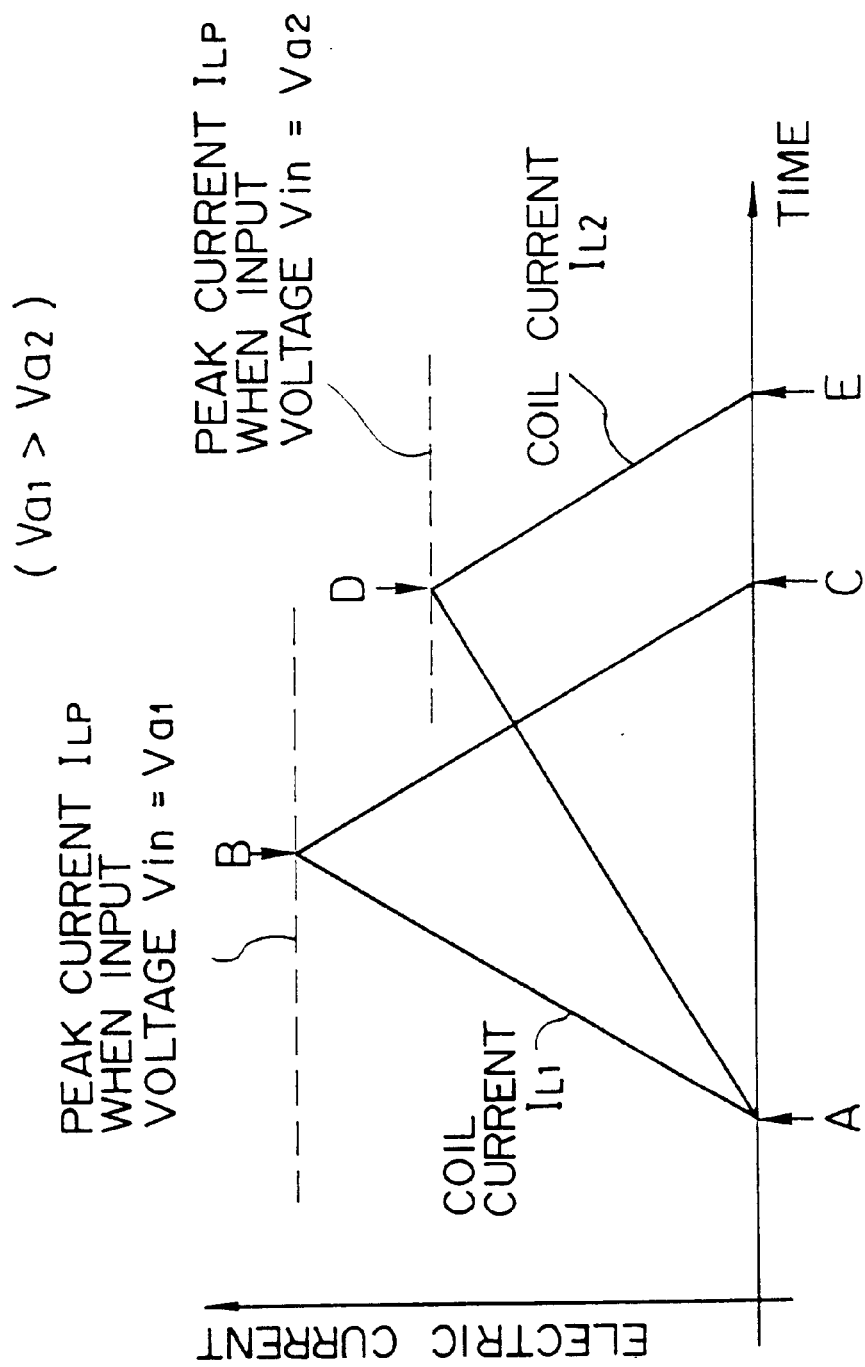
FIG. 12 shows the coil current of the DC/DC converter with the configuration shown in FIG. 11.

FIG. 12 shows the coil current of the DC/DC converter with the configuration shown in FIG. 11. When the input voltage $V_{in}$ becomes low ($V_{a1} \rightarrow V_{a2}$) as shown in FIG. 12, the peak current $I_{LP}$ becomes smaller correspondingly. The area of the triangle ABC or ADE corresponds to the electric charge provided for the load on one electric power supply cycle. Therefore, if resistances R3, R4, and $R_{sense}$ are appropriately selected in a way that the areas of the triangles ABC and ADE match each other using the above described equation (4), then the electric charge provided for the load on one electric power supply cycle can be constant, thereby stabilizing the ripple of the output voltage $V_{out}$.

Since the DC/DC converter with the above described configuration alters the peak current $I_{LP}$ depending on the input voltage $V_{in}$, the problem shown in FIG. 9 can be successfully solved. That is, if the input voltage $V_{in}$ becomes lower when the load current is small in the DC/DC converter shown in FIG. 3, then it may be possible that the coil current $I_L$ cannot reach the peak current $I_{LP}$ and the output voltage $V_{out}$ cannot be appropriately controlled. With the configuration shown in FIG. 11, the peak current $I_{LP}$ becomes smaller when the input voltage $V_{in}$ gets lower. Therefore, the coil current $I_L$ reaches the peak current $I_{LP}$ even when the load current is small and the switching element 1 is set in the OFF state. When the switching element 1 is set in the OFF state, the coil current $I_L$ decreases and the output voltage $V_{out}$ also drops correspondingly. Then, the electric power supply cycle is repeated and the output voltage $V_{out}$ is stably set at a predetermined voltage value.

Figure 13:
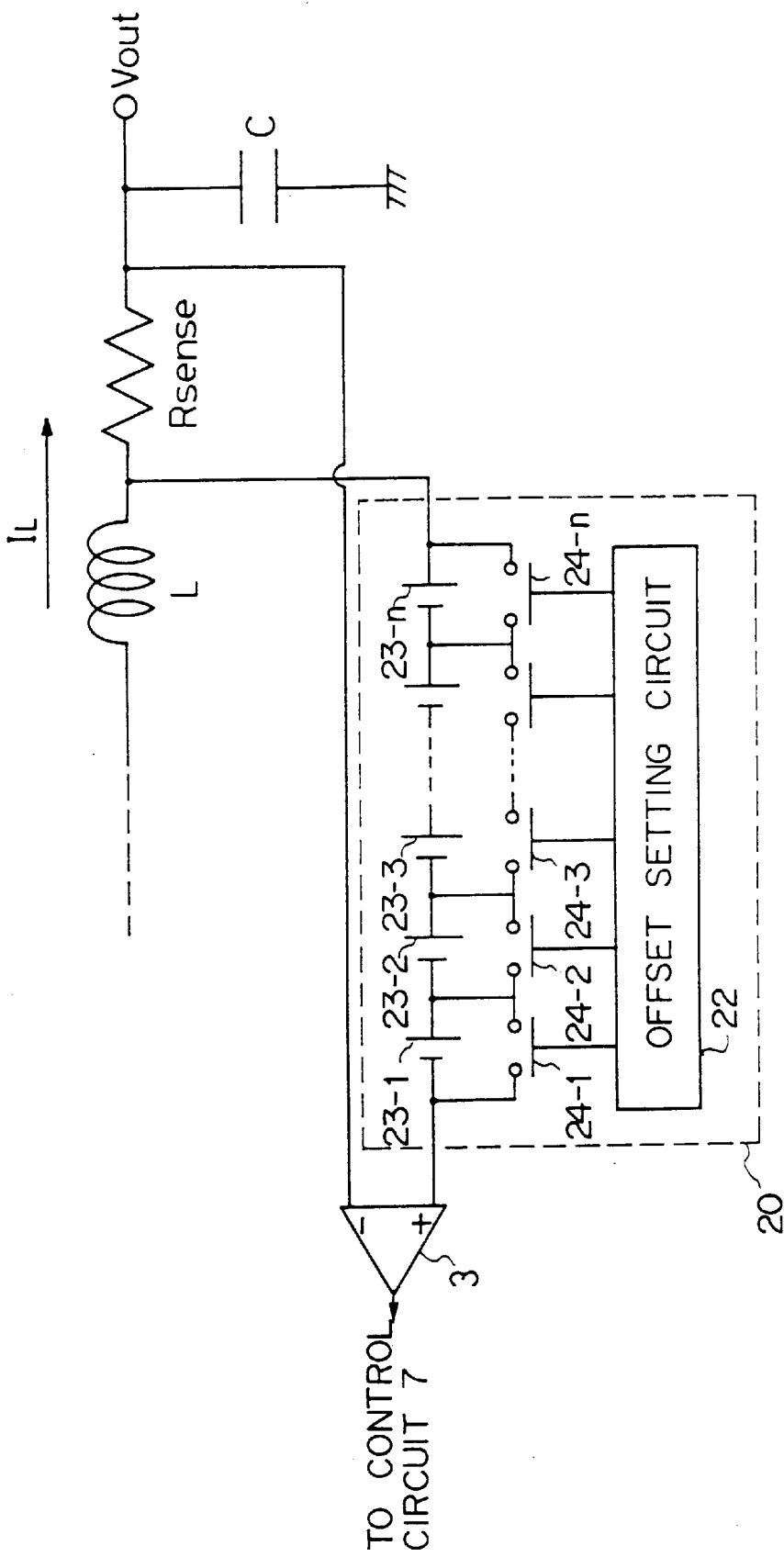
FIG. 13 shows the configuration of the important portion of the second embodiment of the DC/DC converter according to the present invention.

FIG. 13 shows the important portion of the second example of the DC/DC converter according to the present embodiment. With this configuration, an optional peak current $I_{LP}$ is generated using the setting circuit 20 to control the output voltage $V_{out}$ by comparing the peak current $I_{LP}$ with the coil current $I_L$.

Power sources 23-1 through 23-n are serially connected and provided between the positive input terminal of the comparator 3 and the input terminal of resistance $R_{sense}$ (this input terminal refers to the input side of the DC/DC converter. The power sources 23-1 through 23-n generate, for example, the voltage of 10 mV. Switches 24-1 through 24-n are respectively provided for the power sources 23-1 through 23-n, and the ON/OFF state can be controlled according to the offset setting signal output by an offset setting circuit 22. When the switches 24-1 through 24-n are in the ON state, the corresponding power sources 23-1 through 23-n are short-circuited.

The offset setting circuit 22 has a register for storing n-bit information (offset setting signal) and outputs the offset setting signal to the switches 24-1 through 24-n. Each bit of the offset setting signal controls the ON/OFF state of the switches 24-1 through 24-n.

With the above described configuration, assume that the register of the offset setting circuit 22 stores the information about the offset setting signal with two higher order bits set to 0 and with the other bits set to 1. In this case, the switches 24-1 and 24-2 enter the OFF state and the switches 24-3 through 24-n enter the ON state. As a result, only the voltage generated by the power sources 23-1 and 23-2 is applied as an offset to the positive input terminal of the comparator 3. Assuming that each of the power sources 23-1 through 23-n generates the voltage of 10 mV, 20 mV is applied as an offset to the positive input terminal of the comparator 3.

The comparator 3 compares the above described offset with the voltage drop in the resistance $R_{sense}$. That is, the coil current $I_L$ is monitored using the value (peak current $I_{LP}$) obtained by converting the offset into the coil current. Then, the comparison result is provided for the control circuit 7.

Described below is how a value is set as an offset setting signal. The operation mode is switched when the load current indicates $I_{LP}/2$ in the DC/DC converter operating while switching the operation mode depending on the load between the light load mode and the heavy load mode as described above. When the load current is equal to or smaller than $I_{LP}/2$, the DC/DC converter operates in the light load mode. As shown in FIG. 7, the conversion efficiency of the DC/DC converter depends on applications. In the light load mode, the conversion efficiency hardly depends on applications with the input voltage $V_{in}$ set constant. However, in the heavy load mode, the conversion efficiency depends on applications. Thus, the curve of the conversion efficiency for the load current can be predicted by selecting an application.

Figure 14A:
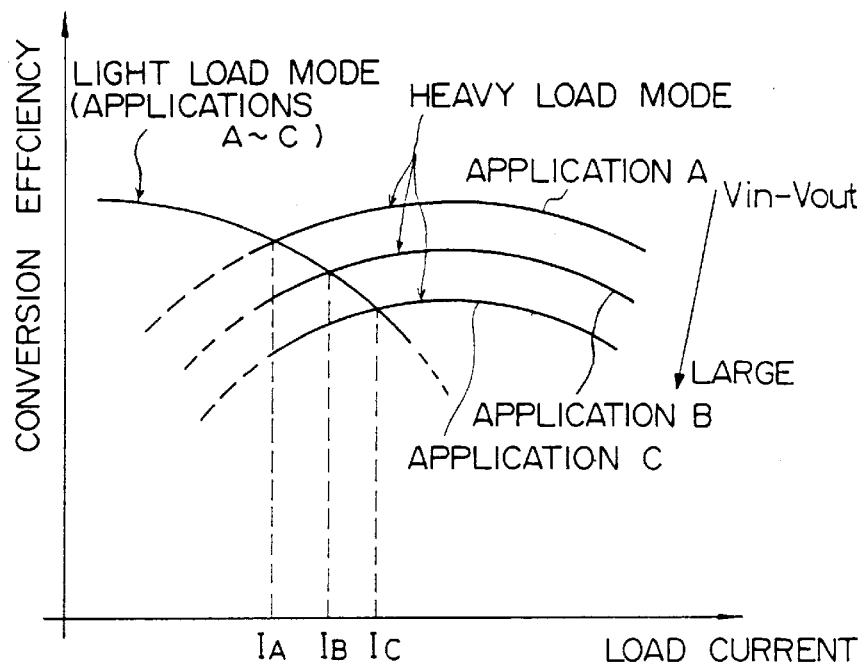
FIG. 14A shows the conversion efficiency of the DC/DC converter when the settings for the output voltage is changed.

FIG. 14 shows the conversion efficiency of the DC/DC converter. FIG. 14A shows the conversion efficiency when the set value of ($V_{in}-V_{out}$) is changed. In this example, the input voltage $V_{in}$ is fixed (for example, at 20 V), and three applications A through C different in operation voltage are connected as the loads to the DC/DC converter. The applications A through C are loads which require the voltages of, for example, 9 V, 5 V, and 3 V respectively.

When the offset setting signal to be stored in the offset setting circuit 22 is determined, the load current is obtained for each application at the intersection between the conversion efficiency curve of the light load mode and the conversion efficiency curve of the heavy load mode in FIG. 14A. These curves are predetermined in a simulation, etc. For example, a load current $I_A$ is obtained for application A. Then, the offset setting signal is determined in a way that the load current $I_A$ indicates $I_{LP}/2$ (half the value of the peak current $I_{LP}$). Practically, the peak current $I_{LP}$ equals $2 \cdot I_A$, and the offset setting signal is determined in a way that the voltage drop in the resistance $R_{sense}$ by the peak current $I_{LP}$ matches the offset voltage of the comparator 3.

Similarly, the offset setting signals are determined for applications B and C based on the load currents $I_B$ and $I_C$ respectively.

If the peak current $I_{LP}$ in the light load mode is set using the offset setting signals determined as described above, the operation mode can be switched while maintaining a high conversion efficiency. For example, application A is operated in the light load mode when the load current is equal to or smaller than $I_A$, and is operated in the heavy load mode when the load current is equal to or larger than $I_A$, thereby minimizing the reduction of the conversion efficiency.

Figure 14B:
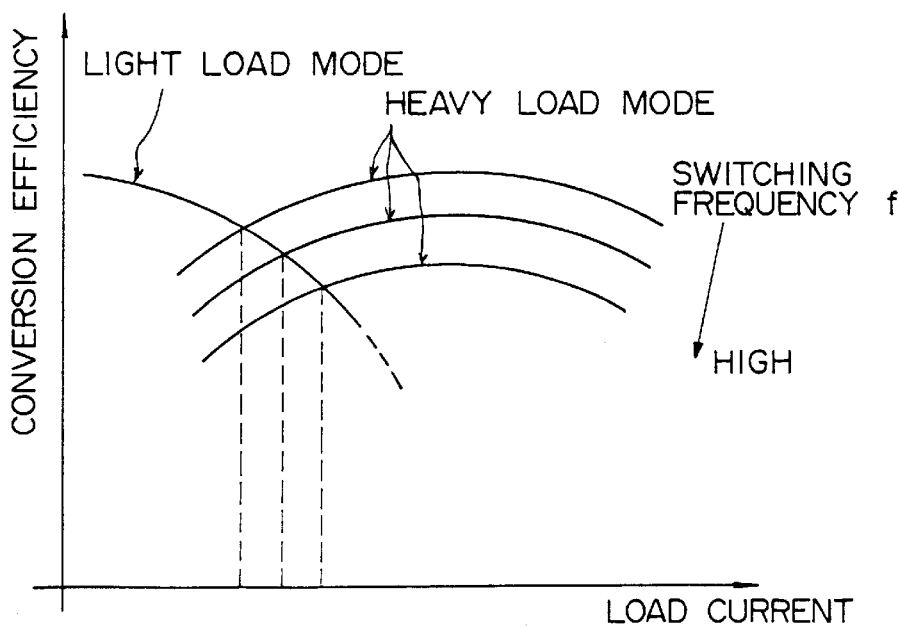
FIG. 14B shows the conversion efficiency of the DC/DC converter when the switching frequency is changed.

FIG. 14B shows the conversion efficiency of the DC/DC converter with the switching frequency altered. The switching frequency refers to the frequency at which the switching element 1 is switched when it is controlled in the heavy load mode by the pulse width modulation (PWM) method. As shown in FIG. 14B, the conversion efficiency of the DC/DC converter in the heavy load mode is lowered as the switching frequency rises. The method of determining the offset setting signal was described by referring to FIG. 14A.

Since the peak current $I_{LP}$ in the light load mode can be set to an optional value in the DC/DC converter with the configuration shown in FIG. 13, the reduction of the conversion efficiency can be minimized.

When the offset setting circuit 22 stores an offset setting signal, the signal can be provided as serial digital data or an analog voltage value after the A/D conversion. The offset setting signal can be generated in the DC/DC converter, or can be externally provided for the DC/DC converter. Furthermore, the offset setting circuit 22 and switches 24-1 through 24-n can be replaced with the configuration in which a socket is provided to short-circuit the power sources 23-1 through 23-n and a jumper line is inserted as necessary to short-circuit any of the power sources 23-1 through 23-n. The configuration shown in FIG. 11 can be combined with the configuration shown in FIG. 13.

According to the above described embodiment, a diode is provided between the switching element 1 and the GND (commonly referred to as an asynchronous type). However, the present invention can also be applied to the configuration in which the diode is replaced with a switching element such as a MOS transistor, etc. to synchronously control the two transistor switches (commonly referred to as a synchronous type).

Since the peak current on which the operation of the DC/DC converter depends can be optionally set according to the present invention, the maximum value of the current to be provided for the load can be altered. Thus, in the DC/DC converter which is operated with the operation mode switched depending on the load between the light load mode and the heavy load mode, the switching point from the light load mode to the heavy load mode can be optionally set. Therefore, a switching point can be appropriately set for the conditions of the DC/DC converter, thereby minimizing the reduction of the conversion efficiency.

Since the above described peak current can be altered with the change in the input voltage of the DC/DC converter, the ripple of the output voltage can be stabilized. As a result, even if the input voltage $V_{in}$ becomes lower when the load current is small, the switching element can be normally operated and the DC/DC converter can be operated in a stable condition.

What is claimed is:

1. A DC/DC converter for changing a coil current by controlling a switching means to control an output voltage, comprising:

output voltage monitor means for setting the switching means to an ON state when the output voltage drops and reaches a predetermined voltage value;

coil current monitor means for setting the switching means to an OFF state when the coil current increases and reaches a reference current value; and setting means for setting the reference current value, wherein said setting means sets the reference current based on an input voltage.

2. The DC/DC converter according to claim 1, wherein said setting means sets the reference current proportional to the input voltage.

3. The DC/DC converter according to claim 2, wherein said coil current monitor means includes:

a first resistor for passing the coil current; and a comparator to a first input terminal of which an output terminal of said first resistor is connected; and said setting means includes:

an electric current source for generating an electric current proportional to the input voltage; and a second resistor for passing an electric current generated by the electric current source, having one terminal connected to an input terminal of said first resistor and another terminal connected to another input terminal of said comparator.

4. The DC/DC converter according to claim 1, wherein said coil current monitor means includes a resistor for passing the coil current, a comparator for monitoring potential at both ends of said resistor, and a control circuit for setting the switching means to the OFF state according to a comparator monitor result; and said setting means generates an offset set in the comparator.

5. A DC/DC converter having at least a light load mode and a heavy load mode as operation modes in supplying a load with an electric current, controlling a switching means by a method corresponding to each operation mode, and thereby controlling an output voltage with a coil current altered, comprising:

light load mode control means for setting the switching means to an ON state when the output voltage drops and reaches a predetermined voltage value, setting the switching means to an OFF state when the coil current increases and reaches a reference current value, and thereby controlling the output voltage;

heavy load mode control means for controlling the switching means by a predetermined method;

mode switching means for switching the operation mode from light load mode to the heavy load mode when the output voltage cannot restore the predetermined voltage; and setting means for setting the reference current in such a way that an electric conversion efficiency can be optimum when the operation mode is switched, wherein said setting means sets the reference current based on an input voltage.

6. The DC/DC converter according to claim 5, wherein a relationship between a load current and the conversion efficiency in the light load mode and the heavy load mode when a predetermined voltage is provided for a connected load is preliminarily computed; and said setting circuit sets the reference current based on a value of the load current when conversion efficiencies of two modes match each other.

7. A circuit for controlling an operation of a DC/DC converter for changing a coil current by controlling a switching means to control an output voltage, comprising:

output voltage monitor circuit for setting the switching means to an ON state when the output voltage drops and reaches a predetermined voltage value;

coil current monitor circuit for setting the switching means to an OFF state when the coil current increases and reaches a reference current value; and setting circuit for setting the reference current value based on an input voltage.

8. A circuit for controlling an operation of a DC/DC converter having at least a light load mode and a heavy load mode as operation modes in supplying a load with an electric current, controlling a switching means by a method corresponding to each operation mode, and thereby controlling an output voltage with a coil current altered, comprising:

light load mode control circuit for setting the switching means to an ON state when the output voltage drops and reaches a predetermined voltage value, setting the switching means to an OFF state when the coil current increases and reaches a reference current value, and thereby controlling the output voltage;

mode switching circuit for switching the operation mode for light load mode to the heavy load mode when the output voltage cannot restore the predetermined value; and setting circuit for setting a reference current with respect to an input voltage, whereby an electric conversion efficiency is improved when the operation mode is switched from the light load mode to the heavy load mode.

9. A DC/DC converter for changing a coil current by controlling a switching transistor to control an output voltage, comprising:

a first comparator which monitors the output voltage and turns said switching transistor ON when the output voltage is below a predetermined voltage value;

a second comparator which monitors an inductor current in an output inductor coupled to said switching transistor, said second comparator turning said switching transistor OFF when said inductor current is above a reference current value; and a reference current setting circuit which determines said reference current value in accordance with an input voltage to said DC/DC converter.

10. The DC/DC converter according to claim 10, wherein said reference current setting circuit sets the reference current in proportion to the input voltage.

11. The DC/DC converter according to claim 10, further comprising:

a first resistor, said inductor current passing through said first resistor, wherein a voltage value at the output side of said first resistor is input to said second comparator; and wherein said reference setting circuit comprises an electric current source which generates an electric current proportional to the input voltage and a second resistor which passes said electric current proportional to the input voltage, one terminal of said second resistor being connected to an input side of said first resistor and another terminal of said second resistor being connected to said second comparator.

12. The DC/DC converter according to claim 9, further comprising:

a first resistor, said inductor current passing through said first resistor; and a controller for turning said switching transistor ON and OFF, wherein said second comparator monitors a potential at both ends of said first resistor, and wherein said controller turns said switching transistor ON and OFF in accordance with an output of said second comparator.

13. The DC/DC convert according to claim 9, wherein said reference setting circuit comprises an offset which is input to said second comparator.

* * * * *